United States Patent
Smith et al.

(10) Patent No.: US 9,426,147 B2
(45) Date of Patent: Aug. 23, 2016

(54) PROTECTED DEVICE MANAGEMENT

(71) Applicants: Ned M. Smith, Beaverton, OR (US); Victoria C. Moore, Phoenix, AZ (US); Steven L. Grobman, El Dorado Hills, CA (US)

(72) Inventors: Ned M. Smith, Beaverton, OR (US); Victoria C. Moore, Phoenix, AZ (US); Steven L. Grobman, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 34 days.

(21) Appl. No.: 14/466,447

(22) Filed: Aug. 22, 2014

(65) Prior Publication Data

US 2014/0366116 A1   Dec. 11, 2014

Related U.S. Application Data

(62) Division of application No. 12/653,796, filed on Dec. 21, 2009, now abandoned.

(51) Int. Cl.
| | |
|---|---|
| G06F 12/14 | (2006.01) |
| G06F 21/00 | (2013.01) |
| G06F 13/12 | (2006.01) |
| H04L 12/24 | (2006.01) |
| H04L 29/06 | (2006.01) |

(Continued)

(52) U.S. Cl.
CPC ........... *H04L 63/083* (2013.01); *G06F 21/305* (2013.01); *G06F 21/74* (2013.01); *G06F 21/78* (2013.01); *G06F 21/85* (2013.01); *H04L 9/0894* (2013.01); *H04L 9/321* (2013.01); *H04L 29/06979* (2013.01); *H04L 63/08* (2013.01); *H04L 63/0807* (2013.01); *G06F 2221/2147* (2013.01); *G06F 2221/2149* (2013.01)

(58) Field of Classification Search
CPC ...... G06F 21/305; G06F 21/74; G06F 21/78; G06F 21/85; G06F 2221/2147; G06F 2221/2149; G06F 21/575; G06F 21/88; G06F 21/572; G06F 21/554; G06F 9/5077; G06F 21/31; G06F 11/3013; G06F 21/53; H04L 29/06979; H04L 63/08; H04L 63/0807; H04L 63/083; H04L 9/0894; H04L 9/321
See application file for complete search history.

(56) References Cited

U.S. PATENT DOCUMENTS

| | | | | |
|---|---|---|---|---|
| 5,919,257 A | * | 7/1999 | Trostle | G06F 21/575 |
| | | | | 726/22 |
| 6,009,527 A | * | 12/1999 | Traw | G06F 21/71 |
| | | | | 710/8 |

(Continued)

FOREIGN PATENT DOCUMENTS

| | | |
|---|---|---|
| CN | 1912886 A | 2/2007 |
| JP | 62-241040 A | 10/1987 |

(Continued)

OTHER PUBLICATIONS

Smith, Ned. "Storage Protection with Intel® Anti-Theft Technology-Data Protection (Intel® AT-d)." Intel Technology Journal 12.4 (2008).*

(Continued)

*Primary Examiner* — Michael Simitoski
(74) *Attorney, Agent, or Firm* — Grossman, Tucker, Perreault & Pfleger, PLLC

(57) ABSTRACT

A method, apparatus, system, and computer program product for management of storage devices protected by encryption, user authentication, and password protection and auditing schemes in virtualized and non-virtualized environments.

6 Claims, 9 Drawing Sheets

(51) Int. Cl.

| | |
|---|---|
| *G06F 21/30* | (2013.01) |
| *G06F 21/74* | (2013.01) |
| *G06F 21/78* | (2013.01) |
| *G06F 21/85* | (2013.01) |
| *H04L 9/08* | (2006.01) |
| *H04L 9/32* | (2006.01) |
| *G06F 13/00* | (2006.01) |

(56) References Cited

U.S. PATENT DOCUMENTS

| | | | | |
|---|---|---|---|---|
| 6,263,441 | B1* | 7/2001 | Cromer | G06F 11/327 |
| | | | | 710/104 |
| 6,823,463 | B1 | 11/2004 | Challener et al. | |
| 7,367,063 | B1* | 4/2008 | O'Toole, Jr. | G06F 21/554 |
| | | | | 713/183 |
| 7,779,220 | B1 | 8/2010 | Pione | |
| 8,103,883 | B2 | 1/2012 | Smith | |
| 2001/0011947 | A1* | 8/2001 | Jaber | G08B 13/1418 |
| | | | | 340/568.1 |
| 2002/0120845 | A1 | 8/2002 | Cromer et al. | |
| 2003/0056051 | A1 | 3/2003 | Burke et al. | |
| 2003/0070099 | A1* | 4/2003 | Schwartz | G06F 21/31 |
| | | | | 726/5 |
| 2003/0120918 | A1 | 6/2003 | Vander Kamp | |
| 2003/0188179 | A1 | 10/2003 | Challener et al. | |
| 2003/0229694 | A1 | 12/2003 | Tsai et al. | |
| 2004/0010579 | A1* | 1/2004 | Freese | G06F 11/3013 |
| | | | | 709/223 |
| 2004/0059907 | A1 | 3/2004 | Cochran et al. | |
| 2004/0103324 | A1 | 5/2004 | Band | |
| 2004/0250107 | A1 | 12/2004 | Guo | |
| 2004/0268113 | A1 | 12/2004 | Rothman et al. | |
| 2005/0114686 | A1* | 5/2005 | Ball | G06F 21/78 |
| | | | | 713/193 |
| 2005/0125648 | A1 | 6/2005 | Luciani et al. | |
| 2005/0138433 | A1* | 6/2005 | Linetsky | G06F 21/31 |
| | | | | 726/19 |
| 2005/0262361 | A1 | 11/2005 | Thibadeau | |
| 2005/0262574 | A1 | 11/2005 | Allen | |
| 2006/0037074 | A1* | 2/2006 | Yang | G06F 21/85 |
| | | | | 726/17 |
| 2006/0236127 | A1 | 10/2006 | Kurien et al. | |
| 2006/0259782 | A1 | 11/2006 | Wang et al. | |
| 2007/0005951 | A1 | 1/2007 | Davis et al. | |
| 2007/0038856 | A1 | 2/2007 | Ali et al. | |
| 2007/0061879 | A1* | 3/2007 | Dailey | G06F 21/78 |
| | | | | 726/19 |
| 2007/0112772 | A1 | 5/2007 | Morgan et al. | |
| 2007/0180167 | A1* | 8/2007 | Tan | G06F 13/4081 |
| | | | | 710/74 |
| 2007/0180449 | A1 | 8/2007 | Croft et al. | |
| 2008/0016313 | A1* | 1/2008 | Murotake | G06F 12/1416 |
| | | | | 711/173 |
| 2008/0052777 | A1 | 2/2008 | Kawano et al. | |
| 2008/0060068 | A1 | 3/2008 | Mabayoje et al. | |
| 2008/0077752 | A1 | 3/2008 | Kinoshita | |
| 2008/0077986 | A1 | 3/2008 | Rivera et al. | |
| 2008/0104701 | A1 | 5/2008 | Peacock et al. | |
| 2008/0130901 | A1 | 6/2008 | Danilak | |
| 2008/0162809 | A1 | 7/2008 | Rothman et al. | |
| 2008/0288782 | A1 | 11/2008 | Iyer | |
| 2009/0006859 | A1* | 1/2009 | Zimmer | G06F 21/575 |
| | | | | 713/186 |
| 2009/0070467 | A1 | 3/2009 | Khosravi et al. | |
| 2009/0113544 | A1* | 4/2009 | Chancey | G06F 21/85 |
| | | | | 726/19 |
| 2009/0222909 | A1 | 9/2009 | Challener et al. | |
| 2010/0042710 | A1 | 2/2010 | Lin | |
| 2010/0082898 | A1 | 4/2010 | Mangold et al. | |
| 2010/0088525 | A1* | 4/2010 | Ureche | G06F 21/80 |
| | | | | 713/193 |
| 2010/0169669 | A1* | 7/2010 | Smith | G06F 21/6218 |
| | | | | 713/193 |
| 2014/0366116 | A1 | 12/2014 | Smith et al. | |

FOREIGN PATENT DOCUMENTS

| | | |
|---|---|---|
| JP | 2002-055891 A | 2/2002 |
| JP | 2004-005105 A | 1/2004 |
| JP | 2006-080636 A | 3/2006 |
| JP | 2008-052704 A | 3/2008 |
| WO | 2011/084265 A2 | 7/2011 |
| WO | 2011/084265 A3 | 12/2011 |

OTHER PUBLICATIONS

Office Action received for Chinese Application No. 201080058803.2, mailed on Jul. 3, 2015, 14 pages English translation and 8 pages of Chinese Office Action.

Office Action received for Australian Patent Application No. 2010340222, mailed on Jul. 2, 2013, 3 Pages of Office Action Only.

Office Action received for Japanese Patent Application No. 2012-544564, mailed on May 20, 2014, 3 page of English Translation and 3 pages of Office Action.

Office Action received for Japanese Patent Application No. 2012-544564, mailed on Nov. 19, 2013, 3 page of English Translation and 3 pages of Office Action.

Notice of Allowance received for Korean Patent Application No. 2012-7016069, mailed on May 19, 2014, 1 page of English Translation and 3 pages of NOA.

Office Action received for Korean Patent Application 10-2012-7016069, mailed on Nov. 16, 2013, 3 Pages of English Translation Only.

Office Action received for Russian Patent Application No. 2012127390, mailed on Nov. 20, 2013, 5 pages of English Translation and 7 pages of Office Action.

International Search Report and Written Opinion received for PCT Patent Application No. PCT/US2010/058228, mailed on Sep. 27, 2011, 10 pages.

International Preliminary Report on Patentability received for PCT application No. PCT/US2010/058228, mailed on Jul. 5, 2012, 8 pages.

Ronald Perez, et al., "Virtualization and Hardware-Based Security", IEEE Computer Society, Sep.-Oct. 2008, pp. 24-31.

Office Action received for Chinese Patent Application No. 201080058803.2, mailed on Oct. 14, 2014, 19 pages of English Translation and 10 pages of CN Office Action.

Final Notice of Reasons for Rejection received for Japanese Patent Application No. 2012-544564, mailed on Nov. 18, 2014, 1 page of English Translation and 2 pages of JP Office Action.

Office Action received for Russian Patent Application No. 2012127390, mailed on Nov. 20, 2014, 2 page of English Translation and 4 pages of Russian Office Action.

Office Action received for Chinese Application No. 201080058803.2, issued Dec. 7, 2015.

* cited by examiner

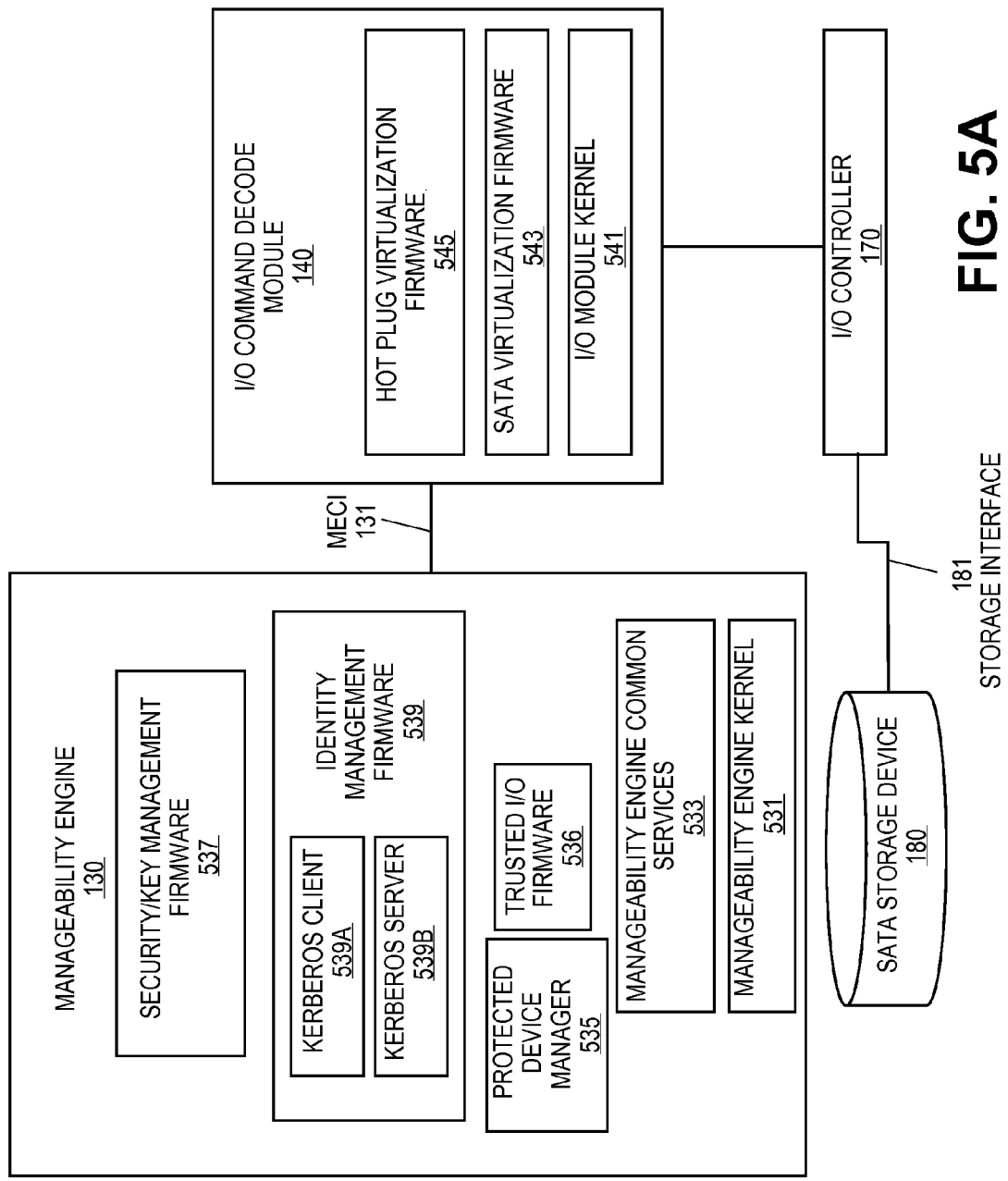

PROTECTED DEVICE MANAGEMENT

This application is a divisional of U.S. application Ser. No. 12/653,796, filed Dec. 21, 2009, the entire content of which is incorporated herein by reference.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

TECHNICAL FIELD

The present disclosure relates generally to management of devices protected by encryption, user authentication, and password protection schemes.

BACKGROUND

Corporate data are increasingly mobile, distributed, and prolific. Data are routinely taken out of physically secured facilities to accommodate workers who travel or have flexible working habits. Data are also distributed geographically as corporations' business interests take them into other cities, states, and countries. Data are prolific in both the rate at which they are generated and in the multi-media formats in which they can be presented. All of these forces drive the evolution of new storage media, higher bandwidth subsystems, and network-connected storage that require that data be protected both while in transit and while at rest.

Data-at-rest (DAR) encryption technology prevents the unauthorized use of data stored on lost or stolen storage devices, thereby preventing these data from being spread on the Internet or other networks. DAR encryption acts as an automated and quick response mechanism to prevent the inevitable loss and theft of storage devices from becoming the loss and theft of the data stored on those devices.

One of the challenges of protecting data stored on various storage devices associated with a computing platform is that encryption technologies and key management strategies differ depending upon the entity performing the encryption. Storage hardware may have built-in encryption capabilities that are unique to the storage hardware vendor, thereby requiring use of the storage hardware vendor's tools to access the data. Software-based encryption requires different key generation and management services than hardware-based encryption and may therefore require use of the software vendor's tools to access the software-encrypted data. Planning for key recovery and migration of data in the event of theft or loss may therefore require use of a number of different vendors' tools to protect and/or recover all of the data associated with a computing platform.

Another challenge of protecting data stored on storage devices is that the storage devices themselves may be protected using a password protection scheme. For example, in accordance with the Advanced Technology Attachment (ATA) specification, a disk lock is a built-in security feature of a hard disk drive. The ATA specification requires that a disk has two passwords: a User password and a Master password. A disk can be locked in two modes: High security mode or Maximum security mode. In High security mode, the disk can be unlocked with either the User or Master password, using the "SECURITY UNLOCK DEVICE" ATA command. There is an attempt limit, normally set to 5, after which the disk must be power cycled or hard-reset before unlocking can be attempted again. Also in High security mode the SECURITY ERASE UNIT command can be used with either the User or Master password.

In Maximum security mode, the disk cannot be unlocked without the User password. The only way to get the disk back to a usable state is to issue the SECURITY ERASE PREPARE command, immediately followed by the SECURITY ERASE UNIT command. In Maximum security mode the SECURITY ERASE UNIT command requires the User password and will completely erase all data on the disk. Thus, if the disk is password protected, set to Maximum security mode, and the User password is unknown, data on the disk is not recoverable.

Yet another challenge of protecting data stored on storage devices associated with a computing platform is that the platform may require authentication of user credentials before access to data on the associated storage devices is allowed. For example, some computing platforms are protected using Kerberos user authentication. Kerberos uses as its basis the symmetric Needham-Schroeder protocol. It makes use of a trusted third party, termed a key distribution center (KDC), which consists of two logically separate parts: an Authentication Server (AS) and a Ticket Granting Server (TGS). Kerberos works on the basis of "tickets" which serve to prove the identity of users.

The KDC maintains a database of secret keys; each entity on the network—whether a client or a server—shares a secret key known only to itself and to the KDC. Knowledge of this key serves to prove an entity's identity. For communication between two entities, the KDC generates a session key which they can use to secure their interactions. The security of the protocol relies heavily on participants maintaining loosely synchronized time and on short-lived assertions of authenticity called Kerberos tickets.

Under the Kerberos protocol, a client authenticates itself to the Authentication Server and receives a ticket. (All tickets are time stamped.) The client then contacts the Ticket Granting Server, and using the ticket it demonstrates its identity and asks for a service. If the client is eligible for the service, then the Ticket Granting Server sends another ticket to the client. The client then contacts the Service Server, and using this ticket it proves that it has been approved to receive the service.

BRIEF DESCRIPTION OF THE DRAWINGS

FIG. 5A shows further details of the system of FIG. 1 in enabling devices protected by encryption, user identity authentication, and password protection schemes to be dynamically attached and the user authentication credentials to be dynamically reconfirmed without rebooting in accordance with one embodiment of the invention.

DETAILED DESCRIPTION

Figure 1:
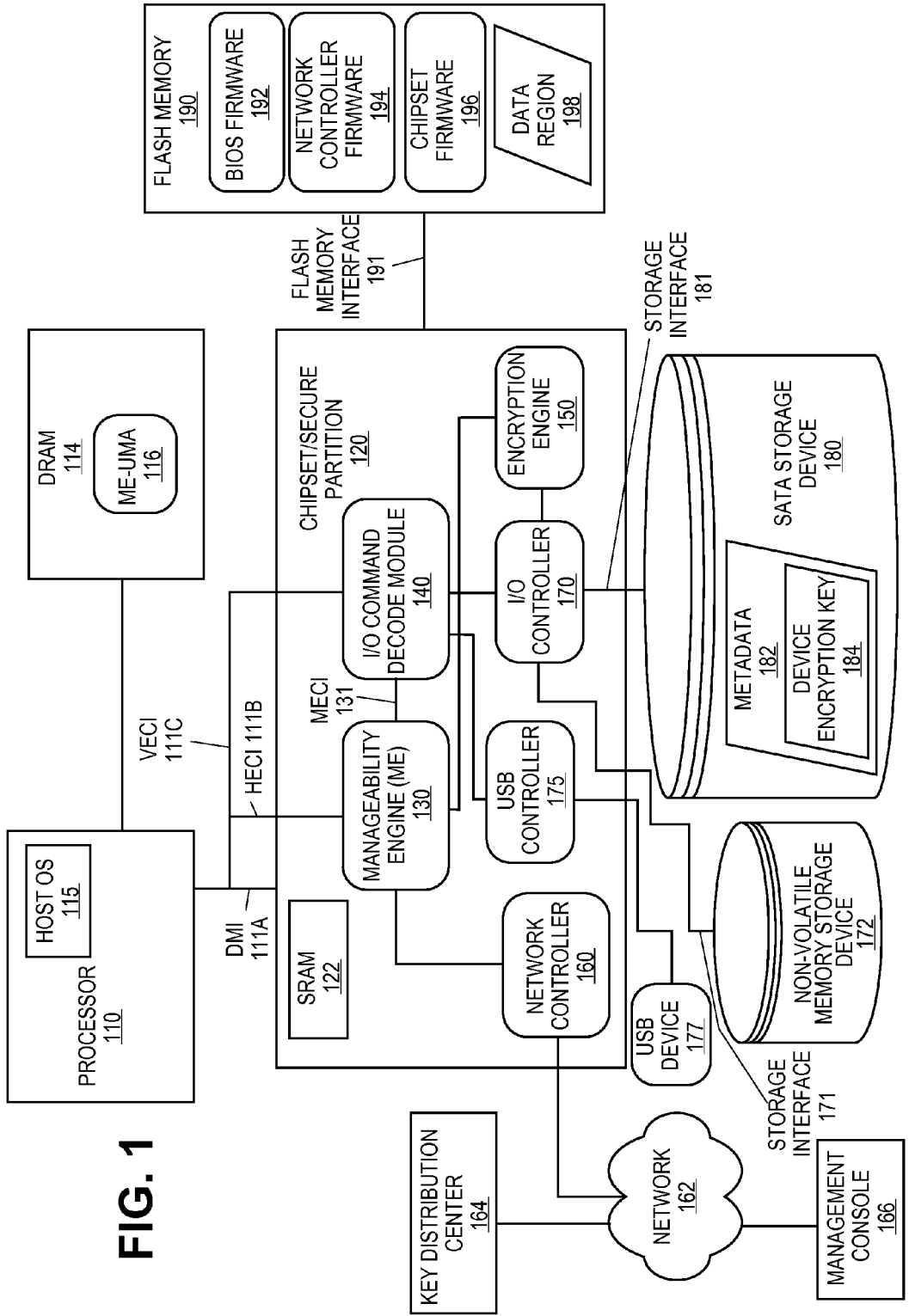
FIG. 1 is a block diagram of a system configured to manage devices protected by encryption, user identity authentication, and password protection schemes in accordance with one embodiment of the invention.

Embodiments of the present invention may provide a method, apparatus, system, and computer program product for managing systems having devices protected by encryption, user identity authentication, and password protection schemes.

Reference in the specification to "one embodiment" or "an embodiment" of the present invention means that a particular feature, structure or characteristic described in connection with the embodiment is included in at least one embodiment of the invention. Thus, the appearances of the phrases "in one embodiment," "according to one embodiment" or the like appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

In one embodiment, protected device management is provided within a secure partition that provides an isolated and controlled environment. The secure partition may receive commands to perform management operations from a trusted management application. The secure partition ensures that commands to manage protected devices are verified as originating with an authenticated source. The trusted management application may be remote from the system and may communicate via a secure communication channel with the secure partition.

The isolated and secure environment of the protected device manager may comprise a variety of different types of partitions, including an entirely separate hardware partition (e.g., utilizing Intel® Corporation's Manageability Engine ("ME"), Active Management Technologies ("AMT"), Platform Resource Layer ("PRL") and/or other comparable or similar technologies) and/or a virtualized partition (e.g., a virtual machine in Intel® Corporation's Virtualization Technology ("VT") scheme). It will be apparent to those of ordinary skill in the art that a virtualized host may also be used to implement ME, AMT and PRL technologies (as described in further detail below with reference to FIG. 8.)

In one embodiment, a protected device manager executes in a secure partition that is isolated from a host operating system of the system. The secure partition may receive a request to unlock an encrypted device coupled to the system. The request is received by the secure partition via a secure communication channel established between a trusted remote console and the secure partition. The secure partition unlocks the encrypted device in response to the request without involvement of the host operating system.

The secure partition may receive a token from the trusted remote console and use the token to unwrap a key used to encrypt blocks of the encrypted device. The secure partition may obtain the key from a secure storage area of the encrypted device, wherein the secure storage area is hidden from the host operating system. The secure partition may confirm that the request originated with the trusted remote console prior to unlocking the encrypted device. The secure partition may perform a management operation after the encrypted device is unlocked, wherein the request further specifies the management operation to be performed, and boot the host operating system after the management operation is performed. Unlocking the encrypted device may be performed when the host operating system of the system is malfunctioning and without involvement of a user of the system.

FIG. 1 illustrates a system configured to manage devices protected by encryption, user identity authentication, and password protection schemes in accordance with one embodiment of the invention. Platform 100 includes a processor 110 connected to a chipset/secure partition 120 via a desktop management interface (DMI) 111*a*. Chipset/secure partition 120 includes a manageability engine (ME) 130, which may be implemented as a microprocessor, to manage the configuration and operation of platform 100. In one embodiment, manageability engine (ME) 130 collects audit events, authenticates users, controls access to peripheral devices, manages encryption keys for protection of data stored on storage devices of platform 100, and interfaces with management console 166 via network controller 160. Using management console 166, manageability engine (ME) 130 maintains consistency with enterprise-wide policies for configuration and management of platforms such as platform 100. Manageability engine (ME) 130 is connected to processor 110 via host embedded controller interface (HECI) 111*b*.

Virtualization engine controller interface (VECI) 111*c* connects processor 110 to I/O command decode module 140 of chipset/secure partition 120. In one embodiment, I/O command decode module 140 is a general-purpose controller that is configured using specialized firmware to perform storage command decoding and other accelerated operations. The functionality of I/O command decode module 140 may also be implemented entirely in special-purpose hardware. I/O command decode module 140 provides management functionality to protect data written to storage devices associated with platform 100. For example, I/O command decode module 140 may interact with encryption engine 150 to encrypt storage devices, protect metadata used for protecting storage devices, intercept and process hardware interrupts related to storage devices, and facilitate management operations on storage devices.

Manageability engine (ME) 130 controls the behavior of I/O command decode module 140 and encryption engine 150 by configuring policies and encryption keys. The operation of manageability engine (ME) 130, I/O command decode module 140, and encryption engine 150 is described in further detail below.

Platform 100 further includes memory devices such as dynamic random access memory (DRAM) 114, static random access memory (SRAM) 122 within chipset/secure partition 120, and flash memory 190. When platform 100 is fully powered, a portion of DRAM 114 referred to as an upper memory area (UMA), ME-UMA 116, is available for use by manageability engine (ME) 130. The host operating system 115 for platform 100 is not able to access ME-UMA 116, in general, because of a memory isolation mechanism that is configured by the Basic Input Output System (BIOS). This memory isolation mechanism locks access to ME-UMA memory 116 before the host operating system runs. By isolating this portion of DRAM 114 for use by manageability engine 130 from the host operating system, the integrity of manageability engine 130 is protected from viruses or other malware that might infect host operating system 115.

Flash memory 190 contains firmware used to initialize platform 100. This initialization firmware includes BIOS firmware 192, network controller firmware 194 to configure network controller 160, and chipset firmware 196 to configure chipset/secure partition 120. The integrity of the chipset firmware 196 for manageability engine (ME) 130 and I/O command decode module 140 is ensured by means of a digital signature before it is stored on the flash memory 190. Data for use by manageability engine (ME) 130, such as user authentication information, may be encrypted by encryption firmware within manageability engine (ME) 130 and stored in a data region 198 of flash memory 190.

The embodiment of platform 100 shown in FIG. 1 further includes Universal Serial Bus (USB) controller 175 connected to USB device 177. USB devices may include pointing devices (such as mice), keyboards, digital cameras, printers, personal media players, flash drives, and external hard drives. The USB specification enables installation and removal of devices without opening the computer case (hotswapping) or restarting the computer, making it useful for mobile peripherals, including drives of various kinds. Originally conceived and still used today for optical storage devices (CD-RW drives, DVD drives, etc.), several manufacturers offer external portable USB hard drives, or empty enclosures for disk drives, which offer performance comparable to internal drives, limited by the current number and type of attached USB devices and by the upper limit of the USB interface (in practice about 40 MiB/s for USB 2.0 and perhaps potentially 400 MiB/s or more for USB 3.0). These external drives have typically included a "translating device" that bridges between a drive's interface (IDE, ATA, SATA, PATA, ATAPI, or even SCSI) to a USB interface port. Functionally, the drive appears to the user much like an internal drive. Other competing standards for external drive connectivity include eSATA, ExpressCard (now at version 2.0), and FireWire (IEEE 1394).

The embodiment of platform 100 shown in FIG. 1 further includes different types of storage devices accessible via an I/O controller 170, including a non-volatile memory storage device 172 accessible via storage interface 171 and Serial Advanced Technology Attachment (SATA) storage device 180 accessible via storage interface 181. Storage interface 171 may be implemented as a non-volatile memory (NVM) host controller interfaces (HCI) for non-volatile memory and storage interface 181 may be implemented as an Advanced HCI (AHCI) interface for Serial Advanced Technology Attachment (SATA) storage device 180. I/O controller 170 includes both NVM and SATA controller functionality.

Data stored on storage devices 172 and 180 may be encrypted by encryption engine 150 of chipset/secure partition 120. SATA storage device 180 is used as an example of a chipset-encrypted device, and further includes a reserved area for storing metadata 182, which includes at least one device encryption key (DEK) 184 for storage device 180 and other metadata used by manageability engine (ME) 130. Metadata 182 is protected from being overwritten by applications running on processor 110 during processing of I/O commands by I/O command decode module 140 and I/O controller 170.

In one embodiment, before encryption or decryption of data is performed by the encryption engine 150 of chipset/secure partition 120, manageability engine (ME) 130 inserts a Device Encryption Key (DEK), such as DEK 184, associated with a storage device involved in an input/output operation into a memory register associated with encryption engine 150. If one physical storage device is logically divided into a number of different logical devices or partitions, then each logical device or partition may have its own respective Device Encryption Key (DEK), and each of those DEKs may be inserted into a respective memory register for encryption engine 150.

In one embodiment, manageability engine (ME) 130 manages encryption of all data associated with platform 100, including encryption performed by encryption engine 150 within chipset/secure partition 120, as well as encryption of data that is not performed by the chipset but instead that is performed by software running on processor 110 or by storage hardware itself. One of the services provided by manageability engine (ME) 130 is management of encryption keys in a common framework and user interface, regardless of the component of the platform 100 that is performing the encryption of the data. Further details about the framework and operation of chipset/secure partition 120 and manageability engine (ME) 130 in managing encryption of data is provided in patent application Ser. No. 12/319,210, entitled "Enforcing Use of Chipset Key Management Services for Encrypted Storage Devices," naming as inventor Ned Smith, which is hereby incorporated by reference herein in its entirety.

Figure 2:
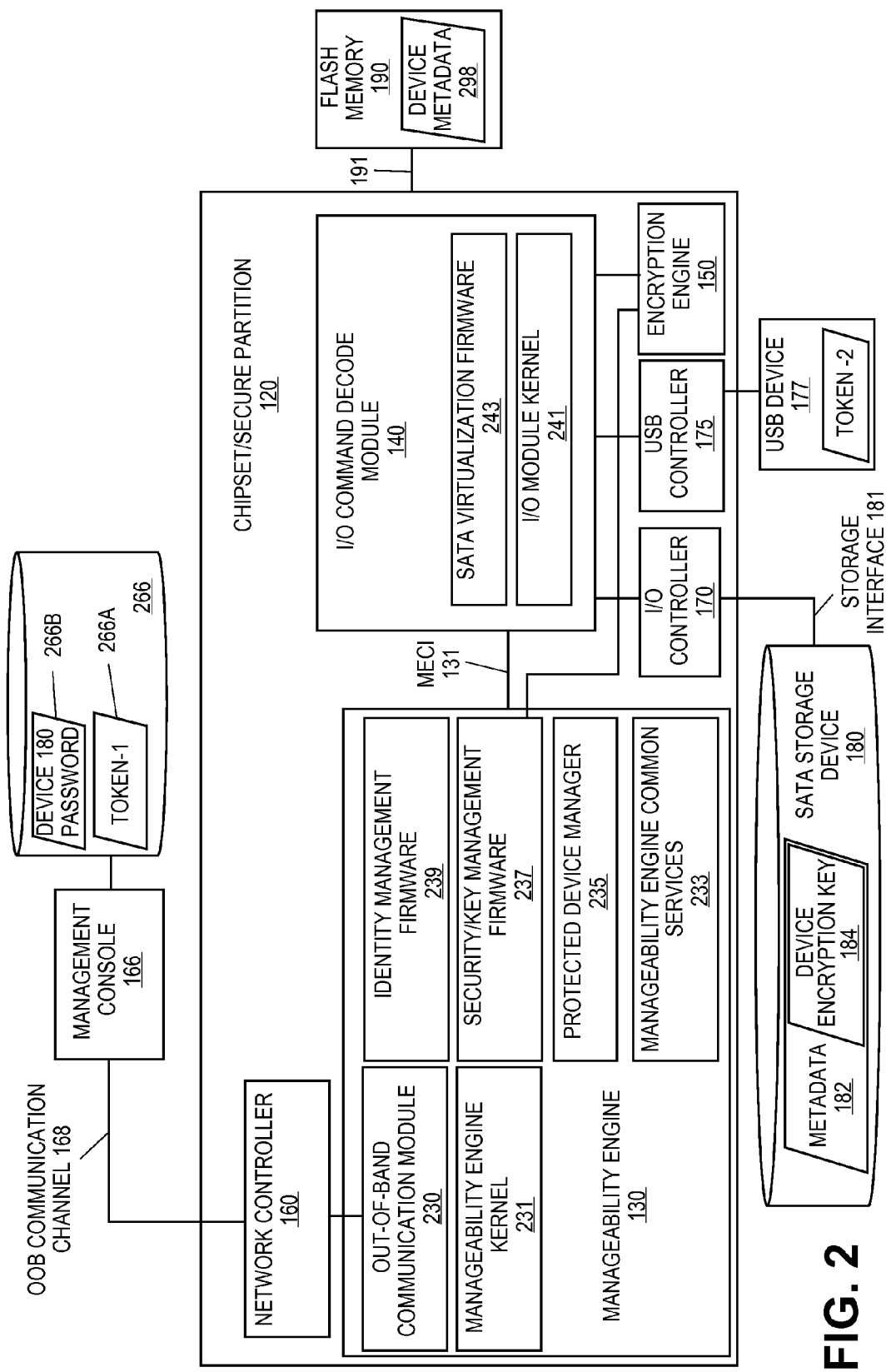
FIG. 2 shows further details of the system of FIG. 1 in managing protected devices in accordance with one embodiment of the invention.

FIG. 2 shows further details of the manageability engine (ME) 130 and I/O command decode module 140 components of chipset/secure partition 120 of FIG. 1 in accordance with one embodiment of the present invention. Within chipset/secure partition 120, manageability engine (ME) 130 includes an ME kernel 231, ME common services 233, protected device manager 235, security/key management firmware 237, and identity management firmware 239. Each of these components is discussed in further detail below.

ME kernel 231 provides basic functionality, including memory usage of SRAM 122 and portions of DRAM 112 (such as ME-UMA 114), storage of data persistently in flash memory 190, and access control. ME kernel 231 controls the operation of I/O command decode module 140 and encryption engine 150.

ME common services 233 include services commonly needed by different firmware modules, and include security services, networking services, and provisioning services. Security services provided by ME common services 233 generally include user authentication consisting of both HTTP Digest and Kerberos authentication; domain authorization using Microsoft Active Directory and/or other services; clock synchronization services to synchronize client and server clocks; and security auditing services.

Networking services provided by ME common services 233 comprise a Transmission Transport Protocol/Internet Protocol (TCP/IP) stack, Transport Layer Security (TLS), Hypertext Transport Protocol (HTTP), Simple Object Access Protocol (SOAP), Web Services for Manageability (WS-MAN), and a host-based TLS interface called the Local Manageability Service (LMS).

Provisioning services provided by ME common services 233 are used in conjunction with management console 166 of FIG. 1 to provision enterprise software to platform 100. These provisioning services support two deployment modes: zero touch and one touch. With zero touch mode, deployment certificate anchor keys are stored in a data storage area such as data region 198 of flash memory 190 of FIG. 1, allowing well-known certificate authority keys to be used to validate IT credentials that can then be used to take ownership of the platform. One touch mode configures organizational certificates, symmetric keys, and trusted hosts that may be used to complete setup and deployment tasks remotely.

Manageability engine 130 also includes out-of-band (OOB) communication module 230. OOB communication module 230 facilitates communication between components of platform 100 with corresponding components of management console 166 via network controller 160. OOB communication module 230 establishes a secure OOB communication channel 168 between chipset/secure partition 120 and management console 166.

Manageability engine (ME) 130 also includes identity management firmware 239. Identity management firmware 239 may compare the user's authentication information with user account metadata stored, for example, in data region 198 of flash memory 190. Identity management firmware 239 may also interact with security/key management firmware 237 of the manageability engine (ME) 130 to confirm that the user's information is also stored in a container within a storage device such as SATA storage device 180. This confirmation of the user's access to a particular storage device such as SATA storage device 180 provides an additional layer of protection of data stored on SATA storage device 180.

Security/key management firmware 237 manages keys such as encryption keys created by encryption engine 150. Security/key management firmware 237 may also authenticate users before access to data stored on storage devices associated with platform 100 is allowed. Security/key management firmware 237 manages key management information and stores this key management information in a memory or storage device associated with the platform, such as flash memory 190 or SATA storage device 180. The location in which key management information is stored depends upon the storage space available and amount of data to be stored, and the invention is not limited to a particular configuration for storing key management information. In one embodiment, security/key management firmware 237 encrypts the key management information using a platform container key (PCK), which is bound to platform 100.

Key management information managed by security/key management firmware 237 includes encryption keys generated by the chipset (i.e., by encryption engine 150 within chipset/secure partition 120) and stored in metadata 182, referred to as a Device Encryption Key (DEK) 184.

Manageability engine (ME) 130 is further shown as including protected device manager 235. In one embodiment, protected device manager 235 communicates with I/O command decode module 140 to supply a device password used to unlock a device such as SATA storage device 180. The operation of protected device manager 235 is described in further detail below with reference to FIGS. 3 and 4.

I/O command decode module 140 is shown as including I/O module kernel 241 and SATA virtualization firmware 243. I/O module kernel 241 provides basic functionality to I/O command decode module 140 and receives commands from ME kernel 231. While SATA virtualization firmware 243 is described with reference to this embodiment as firmware, the functionality of SATA virtualization firwmare 243 may also be implemented as dedicated hardware. SATA virtualization firmware 243 is used to access SATA storage devices such as SATA storage device 180 and enables manageability engine (ME) 130 to perform device management functions. For example, SATA virtualization firmware 243 enables remote access of protected devices by management console 166 by injecting SATA control packets into the I/O data stream without involvement of the host operating system 115 or of other host software running on processor 110. Control packets may be used, for example, to unlock SATA storage device 180 via commands from management console 166.

SATA virtualization firmware 243 is also used to hide a range of linear block addresses on SATA storage device 180 from host operating system 115. This range of hidden linear block addresses hidden from host operating system access is referred to herein as a secure storage area that is protected so that the device metadata 182 can be stored on the drive. Device metadata 182 may include a device encryption key 184 that enables the encryption and decryption of blocks of SATA storage device 180.

SATA virtualization firmware 243 may also intercept events detected by I/O controller 170, such as hot-plug interrupts generated when a new device is attached to platform 100. SATA virtualization firmware 243 may also monitor the I/O stream to and from storage devices and detect events for auditing.

In one embodiment, SATA storage device 180 is protected using both encryption and a password, such as an ATA password, that must be entered by a user before the device can be accessed. The password is used to unlock a native locking mechanism of SATA storage device 180. Encryption engine 150 is used to encrypt blocks of SATA storage device 180. The SATA device encryption key (DEK), such as DEK 184, is stored on the SATA device in a location that is hidden to the host operating system. The device is first unlocked using the password for the native locking mechanism before the DEK can be accessed to decrypt the encrypted blocks.

When platform 100 is reset, I/O command decode module 140 and manageability engine (ME) 130 cooperate to read device metadata, such as the encryption keys and user authentication credentials, from the device and store the device metadata in secure storage, such as flash memory 190 data region 198 as device metadata 298. In one embodiment, for each user that can be authenticated to the management console 166, there is a token, such as Token-1 266A of FIG. 2, which is used to derive a wrapping key for a particular device. The device wrapping key is in turn used to wrap that particular device's encryption key.

The user wrapping key and device wrapping key are used together to determine whether a user can access a particular device, and the user wrapping key/device wrapping key pairs are stored in flash memory 190 data region 198 as device metadata 298. In contrast, the device encryption key such as DEK 184 is stored on the storage device itself. When the device is to be accessed, a copy of the Token-1 is used to determine the appropriate user wrapping key/device wrapping key pair from device metadata 298. The device wrapping key of the pair is used to decrypt metadata 182 on the device, which exposes the device encryption key 184.

Token-1 is used to perform management operations on the storage device when no user is present or when the user cannot produce the needed authentication credentials.

In one embodiment, device metadata 182 is encrypted by encryption engine 150 using another device wrapping key derived by another token, referred to herein as Token-2, that is stored on a USB device such as USB device 177. USB device 177 is intended to be securely stored at a physical location away from where a thief might have access. Token-2 is used to perform management operations on the storage device when no network connection is available for the remote management console 166 to connect to the storage device. The USB device 177 contains Token-2 in an unencrypted, clear-text form so that the holder of Token-2 is implicitly authorized to perform management operations on the storage device. If Token-2 is provided, a second set of user wrapping keys is derived using Token-2, and the second set of user wrapping key/device wrapping key pairs would also be stored in flash memory 190 as part of device metadata 298. Both the Token-1 and Token-2 values are guarded by a user authentication system such as identity management firmware 239 so that only authorized users are able to expose the device encryption keys.

In one embodiment, Token-1 266A is securely archived in remote storage 266 associated with management console 166 (or in a directory service), along with the device 180 password 266B. Device 180 password 266B and Token-1 266A are used by the management console 166 to remotely unlock the SATA device 180. Device 180 password 266B is provided by remote management console 166 to protected device manager 235, which uses the device 180 password 266B to unlock the device. Protected device manager 235 provides Token-1 266A to security/key management firmware 237, which may make use of identity management firmware 239 to unwrap a user wrapping key. The user wrapping key is used to unwrap a device wrapping key, which is used to decrypt metadata 182 and thereby provide access to device encryption key 184 that can be used by encryption engine 150 to decrypt blocks of SATA storage device 180. Token-1 266A is protected from network attacks by relying on a secure communication channel such as OOB communication channel 168 between management console 166 and the chipset/secure partition 120. OOB communication channel 168 may be secured using, for example, Kerberos session keys.

Because data on SATA storage device 180 may be encrypted, the device encryption key (DEK) 184 is stored in a location accessible by manageability engine (ME) 130 protected device manager 235. By making the DEK available to protected device manager 235, SATA read/write requests via the HECI/VECI interfaces 111b and 111c can be serviced even though the data on SATA storage device 180 are encrypted. Once protected device manager 235 has access to the password to unlock SATA storage device 180, protected device manager 235 can make a copy of the device wrapping key which is stored in device metadata 298. The device wrapping key can be used to unwrap the device encryption key contained in device metadata for each SATA device attached to the platform.

Figure 3:
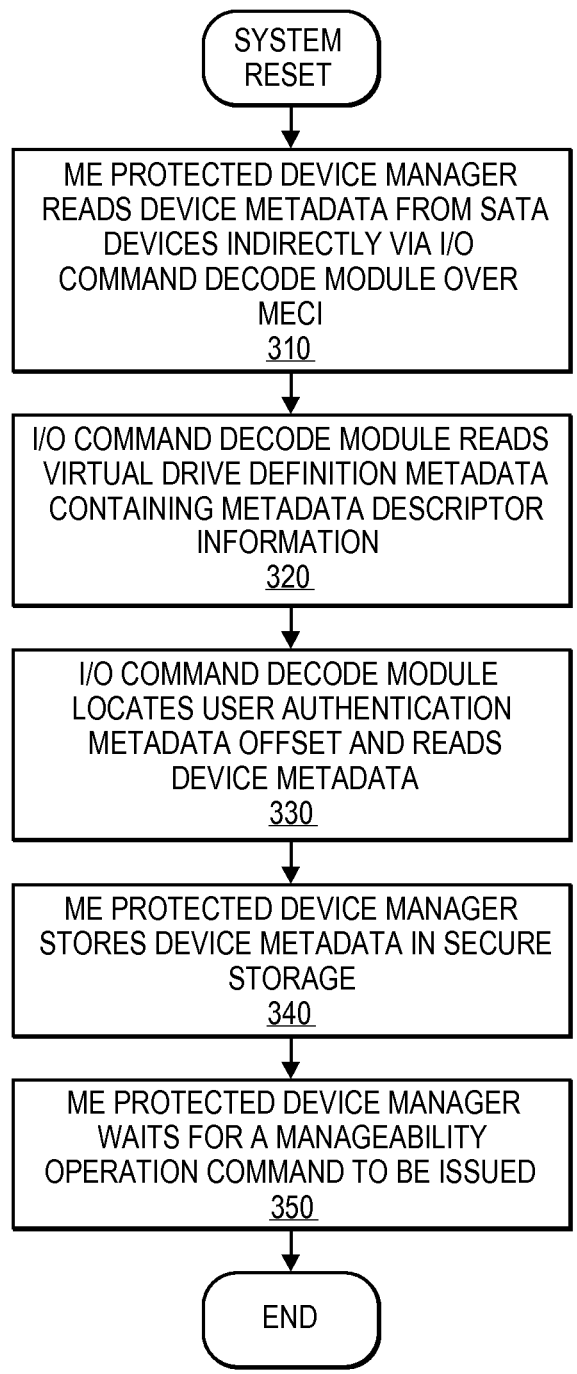
FIG. 3 is a flowchart of a method to be performed upon reset of a system having devices protected by encryption, user identity authentication, and password protection schemes in accordance with one embodiment of the invention.

FIG. 3 is a flowchart of a method to be performed upon reset of a system having devices protected by encryption, user identity authentication, and password protection schemes in accordance with one embodiment of the invention. The method of FIG. 3 will be described as being performed by the components of the system of FIG. 2, although the method is not limited to such an implementation. Upon a system reset, control proceeds to "ME Protected Device Manager Reads Device Metadata from SATA Devices Indirectly via I/O Command Decode Module Over MECI" step 310. In step 310, manageability engine 130 protected device manager 235 obtains information about attached storage devices by reading device metadata from SATA devices such as SATA storage device 180. Because manageability engine 130 is not directly connected to storage devices, manageability engine 130 protected device manager 235 accesses device metadata indirectly via I/O command decode module 140 over MECI 131. Manageability engine 130 protected device manager 235 uses SATA virtualization firmware 243 to access the device metadata stored on SATA devices such as SATA storage device 180. SATA virtualization firmware 243 exposes a storage interface to protected device manager 235, so that SATA storage device 180 appears as a block storage device of linear block addresses. SATA virtualization firmware 243 hides some of the linear block addresses from the host operating system and exposes them to protected device manager 235. SATA virtualization firmware 243 interacts with SATA storage device 180 using the SATA I/O protocol.

From "ME Protected Device Manager Reads Device Metadata from SATA Devices Indirectly via I/O Command Decode Module Over MECI" step 310, control proceeds to "I/O Command Decode Module Reads Virtual Drive Definition Metadata Containing Metadata Descriptor Information" step 320. In step 320, I/O command decode module 140 SATA virtualization firmware 243 reads virtual drive definition metadata that contains metadata descriptor information that is stored in metadata 182 stored on SATA storage device 180. In one embodiment, SATA virtualization firmware 243 virtualizes storage devices, so that multiple virtual drive partitions can be recognized. Each of these virtual drive partitions is described in the virtual drive definition data. Contained within the first virtual hard disk drive (HDD) definition may be traditional drive geometry elements. For example, beginning at Linear Block Address (LBA) zero, a Master Boot Record (MBR) may be stored, followed by the drive data, such as the operating system files and user files. Some systems have hidden partitions that may be used by BIOS or other system utilities. A Host Protected Area (HPA) may be used to store an emergency recovery OS (ROS), a multimedia utility, diagnostic utilities, or other programs. Systems that implement Redundant Arrays of Inexpensive Disks (RAID) may place RAID metadata at the end of the virtual drive. By placing RAID metadata at the end of the virtual drive, the RAID optional ROM can easily locate RAID metadata at system initialization.

In one embodiment, a single Device Encryption Key, such as DEK 184, spans each virtual HDD on the device, resulting in all virtual HDDs being encrypted with the same key. Virtual Drive Definition (VDD) data is placed at the end of the physical drive, such as at the last Linear Block Address LBA-n. VDD data contain drive geometry, marking the beginning and end of each virtual HDD. The VDD also identifies the start and end locations of the manageability engine metadata area, such as the start and end locations of metadata 182. The VDD and ME metadata may not be encrypted by encryption engine 150 but the contents of metadata 182 are protected by I/O command decode module 140 and manageability engine (ME) 130.

In one embodiment, metadata 182 includes an AHCI file system block, pre-boot authentication (PBA) code, and PBA metadata. An AHCI file system is used by a firmware storage driver, which may be executed by processor 110. Metadata 182 may also include the wrapped DEK 184, device configuration data, drive conversion status information, and a drive migration package that may be used to migrate the device, such as SATA storage device 180, to another platform. The migration package also contains a copy of the DEK 184 wrapped with a recovery key that is not specifically tied to a platform. Metadata 182 may also contain PBA executables and an identifier for a storage area containing PBA code to be executed during pre-boot on the host processor 110 before the host operating system is loaded. For example, this storage area containing PBA code may be a portion of flash memory 190. Access to the PBA area is permitted by code executing on host processor 110 via the I/O command decode module 140 using VECI 111c or via manageability engine (ME) 130 via a host command interface that uses HECI 111b. I/O command decode module 140 ensures that requests to access the PBA storage area are limited to the range of storage in which PBA executables are stored because PBA code executes on the host processor 110.

When I/O command decode module 140 SATA virtualization firmware 243 reads virtual drive definition metadata that contains metadata descriptor information that is stored in metadata 182 stored on SATA storage device 180 in "I/O Command Decode Module Reads Virtual Drive Definition Metadata Containing Metadata Descriptor Information" step 320, the metadata descriptor information may include multiple instances of a wrapped device encryption key such as DEK 184 within device metadata 182. For example, DEK 184 may be wrapped both by a device wrapping key that is platform-specific as well as wrapped by a recovery key that is not tied to platform 100. Because multiple instances of the device encryption key may be present, there is a need to determine the location of the particular device encryption key that can be unwrapped using the user authentication credentials involved in performing the system reset.

As described above, the user performing the system reset will have an associated user wrapping key that is used to wrap a device wrapping key. The user wrapping key/device wrapping keys are stored in device metadata 289 of flash memory 190. Control proceeds to "I/O Command Decode Module Locates User Authentication Metadata Offset and Reads Device Metadata" step 330. In step 330, I/O command decode module 140 uses the metadata descriptor information to locate a user authentication metadata offset within flash memory 190 for the user credentials being used to perform the system reset. User authentication metadata and other device metadata are read from the location of flash memory 190 that is identified by the offset.

After reading device metadata 298 from flash memory 190 in "I/O Command Decode Module Locates User Authentication Metadata Offset and Reads Device Metadata" step 330, control proceeds to "ME Protected Device Manager Stores Device Metadata in Secure Storage" step 340. For example, ME protected device manager 235 may store device metadata including user authentication credentials for SATA storage device 180 in device metadata 298 of flash memory 190 for later access by manageability engine (ME) 130. Control then proceeds to "ME Protected Device Manager Waits for a Manageability Operation Command to be Issued" step 350. For example, ME protected device manager 235 waits for a manageability operation command, such as an unlock command, to access SATA storage device 180. When a manageability operation command is received, ME protected device manager 235 can access the stored metadata to obtain user authentication credentials and/or other information needed to access SATA storage device 180.

Figure 4:
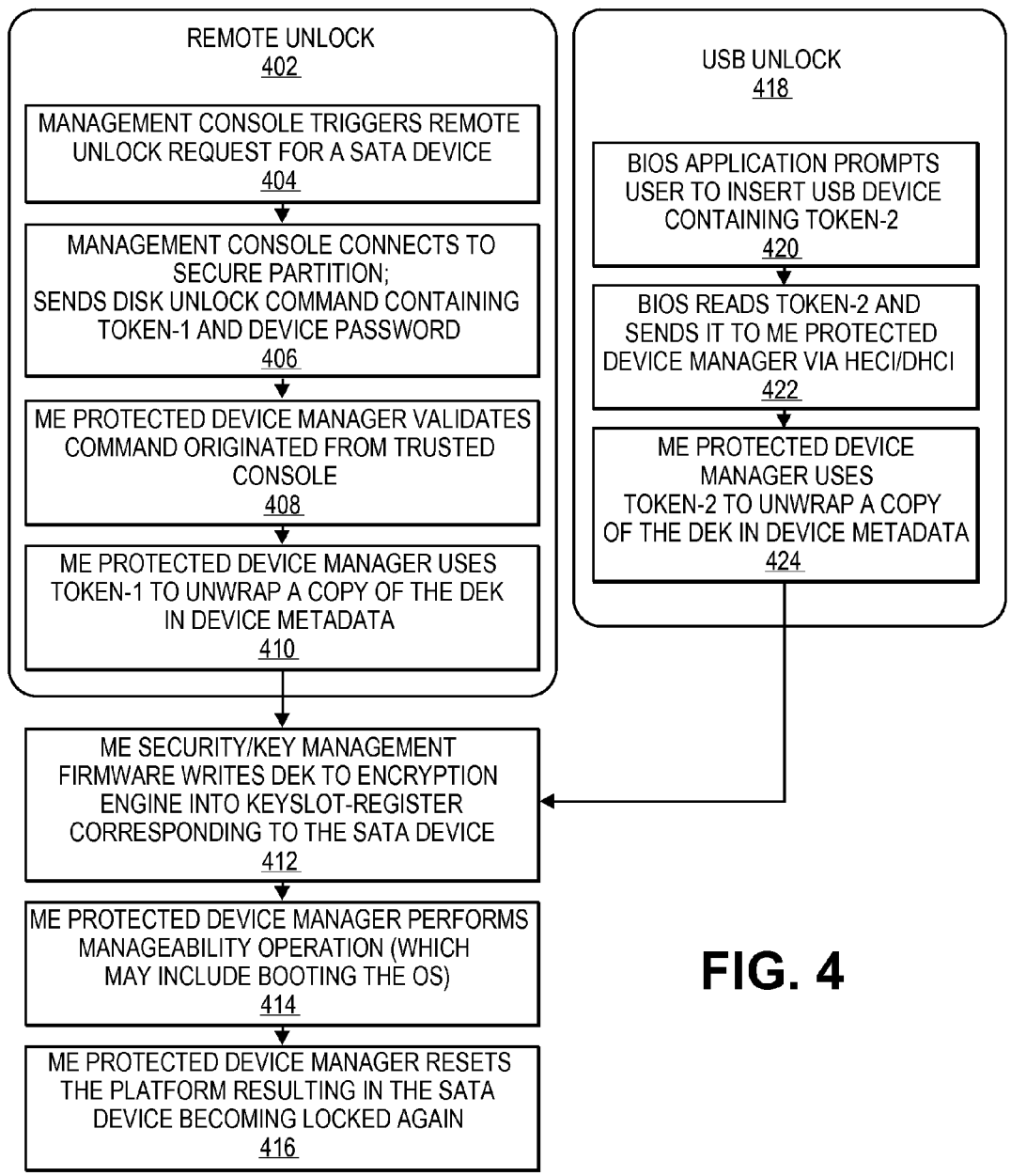
FIG. 4 is a flowchart of a method to be performed upon receiving a command to unlock devices protected by encryption, user identity authentication, and password protection schemes in accordance with one embodiment of the invention.

FIG. 4 is a flowchart of a method to be performed upon receiving a command to unlock devices protected by encryption, user identity authentication, and password protection schemes in accordance with one embodiment of the invention. The method of FIG. 4 will be described as being performed by the components of the system of FIG. 2, although the method is not limited to such an implementation. Two examples of method flows are provided in FIG. 4, depending upon the origin of the request to unlock a protected device. The method steps included in remote unlock block 402 involve processing a remote unlock command, such as an unlock command received from management console 166 via a secure communication channel such as OOB communication channel 168. The method steps included in USB unlock block 418 involve processing an unlock command in conjunction with a USB device storing a token to unlock the storage device.

The method steps in remote unlock block 402 for processing a remote unlock command begin with "Management Console Triggers Remote Unlock Request for a SATA Device" step 404. Management console 166 may initiate the request in response to enterprise management policies, or management console 166 may act in response to a notification from manageability engine (ME) 130 that a device such as SATA storage device 180 should be unlocked. Management console 166 triggers the request to unlock the encrypted SATA device via the manageability engine (ME) 130 and chipset/secure partition 120 in circumstances when no user is present at the keyboard, when a user is present but unable to successfully authenticate to the platform, when the platform is in a low power state (such as one of the Advanced Configuration and Power Interface (ACPI) Sx power states S1 through S5), when the system is connected via a wired or wireless network or outside a corporate firewall but the device is inaccessible, and when the host operating system for the system is malfunctioning.

Control proceeds from "Management Console Triggers Remote Unlock Request for a SATA Device" step 404 to "Management Console Connects to Secure Partition; Sends Disk Unlock Command Containing Token-1 and Device Password" step 406. Management console 166 can use an independently secured and encrypted channel such as OOB communication channel 168 to send secure commands that instruct unlock operations to an embedded security subsystem provided by chipset/secure partition 120. When the secure communication channel such as OOB communication channel 168 is established between management console 166 and chipset/secure partition 120, Kerberos authentication is used by identity management firmware 239 to authenticate the management console 166 and manageability engine (ME) 130. If the remote unlock request was initiated by the manageability engine (ME) 130, after establishing the secure communication channel, management console 166 can obtain user credentials such as a username and password for a user associated with platform 100. If the remote unlock request was initiated by management console 166, administrator user credentials may be used for platform 100. These user credentials are used by management console 166 to obtain an associated password for the device, such as device 180 password 266B, and token used to decrypt the device, such as Token-1 266A, from management data store 266.

In "Management Console Connects to Secure Partition; Sends Disk Unlock Command Containing Token-1 and Device Password" step 406, the device password is included in the unlock command so that the device can be unlocked using the device password. By including Token-1 in the command, a user wrapping key/device wrapping key can be identified, such as in device metadata 298. The user wrapping key/device wrapping key can be used to decrypt blocks of the encrypted storage device, including metadata 182 that includes the device encryption key 184.

From "Management Console Connects to Secure Partition; Sends Disk Unlock Command Containing Token-1 and Device Password" step 406, control proceeds to "ME Protected Device Manager Validates Command Originated from Trusted Console" step 408. The Kerberos authentication credentials that were necessary to establish a secure communication channel between management console 166 and chipset/secure partition 120 may be used to validate that the command originated with the trusted management console 166. Control then proceeds to "ME Protected Device Manager Uses Token-1 to Unwrap a Copy of the DEK in Device Metadata' step 410. As described above, once protected device manager 235 has access to the device 180 password 266B to unlock SATA storage device 180, protected device manager 235 can make a copy of the device wrapping key which is stored in device metadata 298 of flash memory 190. The device wrapping key can be used to unwrap the device encryption keys contained in device metadata for each SATA device attached to the platform.

Once ME protected device manager 235 obtains the device encryption key for the encrypted storage device, control proceeds to "ME Security/Key Management Firmware Writes DEK to Encryption Engine into Keyslot Register Corresponding to the SATA Device" step 412. As described in patent application Ser. No. 12/319,210, entitled "Enforcing Use of Chipset Key Management Services for Encrypted Storage Devices," naming as inventor Ned Smith, which is incorporated herein by reference above, device encryption keys may be stored in keyslot registers within encryption engine 150. When the device is accessed, encryption engine 150 then uses the stored device encryption keys from the corresponding keyslot register to decrypt data stored on the corresponding device.

After the device encryption key is made accessible to encryption engine 150 in "ME Security/Key Management Firmware Writes DEK to Encryption Engine into Keyslot Register Corresponding to the SATA Device" step 412, control proceeds to "ME Protected Device Manager Performs Manageability Operation (which may include Booting the OS)" step 414. For example, in response to a remote unlock command, ME protected device manager 235 unlocks the device, which may including providing a device password to unlock the device and using encryption engine 150 to decrypt blocks of the encrypted device. If the device is further encrypted by host software, the manageability operation may require management console 166 to communicate with trusted host software to further decrypt the device. In response to a USB unlock command, ME protected device manager 235 similarly unlocks the device, including using a device password to unlock the device and encryption engine 150 to decrypt blocks of the encrypted device. Depending upon the particular manageability operation command being processed, the platform may be rebooted, including booting the host operating system.

After the manageability operation is performed in "ME Protected Device Manager Performs Manageability Operation (which may include Booting the OS)" step 414, control proceeds to "ME Protected Device Manager Resets the Platform Resulting in the SATA Device becoming Locked Again" step 416. ME protected device manager 235 performs the steps described with reference to FIG. 3 to reset the system, which results in the storage device being locked again.

As described above, FIG. 4 also includes method steps for unlocking a device manually using a USB unlock command. The method steps in USB unlock block 418 for processing a USB unlock command begin with "BIOS Application Prompts User to Insert USB Device Containing Token-2" step 420. Upon system startup, a BIOS application prompts the user to insert a USB device containing Token-2 to enable the user to access a device such as SATA storage device 180. For example, such a BIOS prompt might be provided if the user is unable to supply a password to access the device. Control proceeds to "BIOS Reads Token-2 and Sends it to ME Protected Device Manager via HECI/DHCI" step 422. The BIOS application reads Token-2 provided by the user and sends Token-2 to ME protected device manager 235 via HECI 111b. Control then proceeds to "ME Protected Device Manager Uses Token-2 to Unwrap a Copy of the DEK in Device Metadata" step 424. As described above, once protected device manager 235 has access to an unlock token to unlock SATA storage device 180, protected device manager 235 can make a copy of the Device Wrap Key (DWK) which is stored in device metadata such as flash memory 190 data region 198. The DWK can be used to decrypt the DEK contained in device metadata for each SATA device attached to the platform. After the device encryption key is made accessible to encryption engine 150 in "ME Security/Key Management Firmware Writes DEK to Encryption Engine into Keyslot Register Corresponding to the SATA Device" step 412, control proceeds as described above.

The system of FIGS. 2, 3, and 4 enable a device to be unlocked without involvement of a host operating system. Special considerations are necessary if it is desirable that the credentials of a user of a system be authenticated before access is allowed to any device attached to the system. This authentication typically occurs upon booting the system, so that devices that are dynamically attached without rebooting the system bypass the confirmation of the user's authentication credentials. It is preferable that access to a hot-plugged device by a user be authenticated, but rebooting the system to confirm the user's credentials is unduly burdensome. Enabling authentication for dynamic attachment of a storage device is useful, for example, in ensuring that dynamic replacement of storage devices that are part of a RAID array are performed by an authorized user.

A similar problem occurs in a device that is locked or encrypted using ATA commands. An ATA-locked or ATA-encrypted device is unlocked by the BIOS at system startup, and thus cannot be hot-plugged into a system. Rebooting the system is necessary to unlock or decrypt the device before data on the device can be accessed.

Figure 5B:
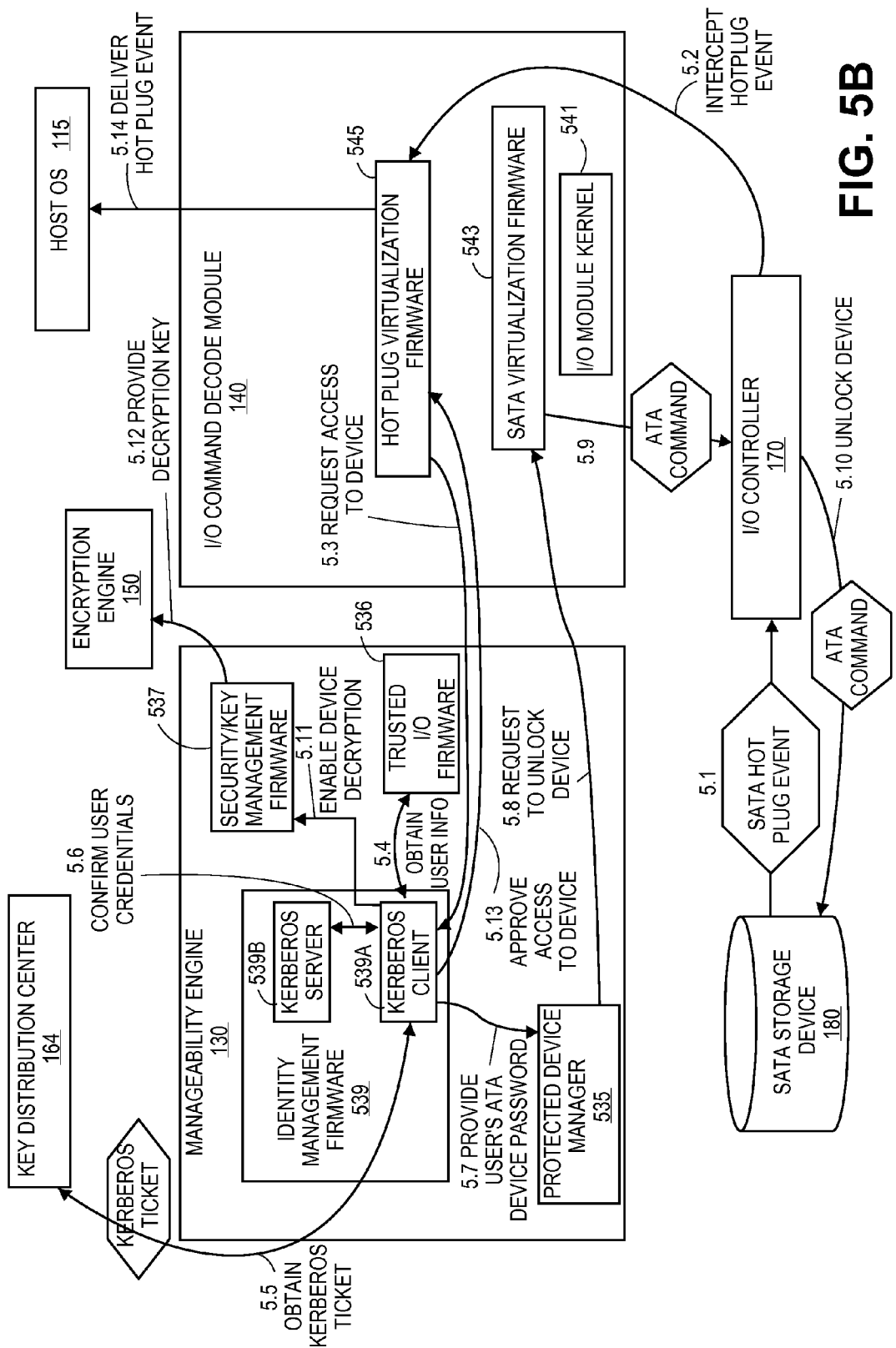
FIG. 5B is a flow diagram of a method to be performed by the system of FIG. 5A upon recognizing a hot plug event of a device.

The system of FIGS. 5A and 5B enables access to a hot-plugged device to be conditioned upon authentication of the credentials of a user of the system. The hot-plugged device can be unlocked and/or decrypted and the user's credentials can be confirmed without rebooting the system, even if the device is locked or encrypted using ATA commands.

The system of FIGS. 5A and 5B requires authenticating first credentials of a user of a system before access is allowed to any device of a plurality of devices attached to the system. An event indicating attachment of a new device to the system is intercepted by a secure partition of the system that is isolated from a host operating system of the system. Second credentials to access the new device are requested without rebooting the system, the second credentials are authenticated, and access to the new device is enabled after authenticating the second credentials. A hot plug event for the new device is delivered from the secure partition to the host operating system.

Requesting the second credentials to access the new device may include using trusted path connections to a display device to display a request for the second credentials and a user input device to receive the second credentials. Authenticating the first and second credentials may include authenticating the first and second credentials with a trusted third party. The second credentials may include a password for the new device, and enabling access to the new device may include using the password to unlock the new device. The second credentials may include a user identifier, and enabling access to the new device may include providing the user identifier to a trusted third party and enabling access to the new device if the trusted third party authenticates the user identifier.

FIG. 5A shows further details of the system of FIG. 1 in enabling devices protected by encryption, user identity authentication, and password protection schemes to be dynamically attached and the user authentication credentials to be dynamically reconfirmed without rebooting in accordance with one embodiment of the invention. Manageability engine kernel 531, manageability engine common services 533, security/key management firmware 537, I/O module kernel 541, and SATA virtualization firmware 543 operate as described with reference to corresponding components of the system of FIG. 2.

Within manageability engine (ME) 130, identity management firmware Kerberos client 539A interacts with identity management firmware Kerberos server 539B to authenticate users. Kerberos client 539A implements the Kerberos protocol to a Key Distribution Center, such as Key Distribution Center 164 of FIG. 1. Kerberos client 539A may use trusted I/O firmware 536 (if available) to use trusted path connections to a display device and a user input device to obtain credentials from a user of the system. Kerberos client 539A may provide the user credentials to Key Distribution Center 164 and obtain a Kerberos ticket to access a Kerberos service, such as Kerberos server 539B. Kerberos server 539B enables access to SATA storage device 180 upon receiving a Kerberos ticket indicating that a user's credentials to access the device have been authenticated. The Kerberos ticket may include an extension field that contains a user token, such as Token-1 266A of FIG. 2, that enables generation of a user wrapping key that can be used to unwrap a device wrapping key and a device encryption key as described above with reference to FIG. 2. The Kerberos ticket may also include an extension field that contains a device password, such as device 180 password 266B of FIG. 2, that can be used to unlock the device.

Within I/O command decode module 140, hot plug virtualization firmware 545 decodes hot plug events received by I/O controller 170 and processes those events prior to forwarding a hot plug event to the host operating system 115. The operation of hot plug virtualization firmware 545 is described in further detail with reference to FIG. 5B.

FIG. 5B is a flow diagram of a method to be performed by the system of FIG. 5A upon recognizing a hot plug event of a device. In action 5.1, I/O controller 170 detects a SATA hot plug event, where SATA storage device 180 has been dynamically attached to platform 100. In action 5.2, hot plug virtualization firmware 545 intercepts the hot plug event and interacts with SATA virtualization firmware 543 to discover attributes of the device. Hot plug virtualization firmware 545 request access to the hot-plugged device from Kerberos client 539A of identity management firmware 539. If the device is locked using an ATA password scheme, ATA encryption, and/or chipset-based encryption, hot plug virtualization firmware 545 may also notify Kerberos client 539A that SATA storage device 180 is locked as part of the request to access the device.

In action 5.4, Kerberos client 539A obtains user information such as user authentication credentials. Kerberos client 539A may determine whether the user's credentials are cached locally within manageability engine (ME) 130, such as in SRAM 122. If the user's credentials are cached locally, actions 5.4 and 5.5 may be bypassed. If the user's credentials are not cached locally, these user authentication credentials may be obtained via trusted I/O firmware 536 if available on platform 100. Trusted I/O firmware 536 makes use of trusted path connections, such as a trusted path connection to a display device to display a request for the credentials and a trusted path connection to a user input device, such as a keyboard, to receive the credentials. In an embodiment in which trusted I/O firmware 536 is not available on platform 100, a notification may be sent to a host agent (not shown) running on processor 110 that a new device has been attached. The host agent can gather the user's credentials and connect to the chipset/secure partition 120 to unlock the device and make the device visible to host operating system 115.

In action 5.5, Kerberos client 539A obtains a Kerberos ticket from key distribution center 164. In one embodiment, the Kerberos ticket is provided along with an unlock token for the user, such as Token-1 266A of FIG. 2, for SATA storage device 180 and an ATA password belonging to the user, such as device 180 password 266B of FIG. 2. This unlock token and ATA password for the user may be obtained from a directory service, such as management console 166 of FIGS. 1 and 2. The Kerberos ticket confirms the authenticity of the user's credentials to receive service from Kerberos server 539B. In one embodiment, Kerberos server 539B enables Kerberos client 539A to all access other services within manageability engine (ME) 130, such as services from security/key management firmware 537 and protected device manager 539. In other embodiments, a separate Kerberos ticket may be obtained to access services provided by other manageability engine (ME) 130 components, such as security/key management firmware 537. In one embodiment, the unlock token for the user for SATA storage device 180 and the ATA password belonging to the user are delivered as an extension field that is part of the Kerberos session key.

In action 5.6, Kerberos client 539A confirms the user's credentials with Kerberos server 539B. In an alternative embodiment, Kerberos client 539A may confirm the user's credentials directly with key distribution center 164 without going through a local Kerberos server such as Kerberos server 539B. For example, Kerberos client 539A may obtain a Kerberos ticket to access a different user authentication service such as an Active Directory service that will return Token-1 266A and device 180 password 266B in a subsequent exchange. In one embodiment, management console 166 of FIGS. 1 and 2 may proxy a connection to a different user authentication service and/or host the user authentication service itself.

Actions 5.7 through 5.10 describe actions taken if the hot-plugged SATA storage device 180 is protected by a native locking mechanism such as an ATA password or ATA encryption. If the device is not protected by a native locking mechanism such as ATA password or ATA encryption, steps 5.7 through 5.10 would be bypassed.

In action 5.7, in a situation where hot-plugged SATA storage device 180 has been locked using an ATA password, Kerberos client 539A provides the user's ATA password to protected device manager 535. In action 5.8, protected device manager 535 provides the user's ATA password to SATA virtualization firmware 543 of I/O command decode module 140. In action 5.9, SATA virtualization firmware 543 sends an ATA command to I/O controller 170 to unlock SATA storage device 180. In action 5.10, I/O controller 170 uses the ATA command to unlock SATA storage device 180. As described above, if the SATA storage device 180 has been encrypted by encryption engine 150, security/key management firmware/Kerberos server 537 may work in conjunction with identity management firmware/Kerberos client 539 to use the user's unlock token contained in an extension field of the Kerberos ticket to derive a user wrapping key. The user wrapping key can be used to access a device wrapping key and device encryption key from SATA storage device 180.

Actions 5.11 and 5.12 describe actions taken if the hot-plugged SATA storage device 180 is encrypted by encryption engine 150. If the hot-plugged SATA storage device is not encrypted by encryption engine 150, steps 5.11 and 5.12 would be bypassed. If the hot-plugged SATA storage device 180 is encrypted by chipset/secure partition 120 encryption engine 150, in action 5.11, Kerberos client 539A may request security/key management firmware 537 to enable device decryption for hot-plugged SATA storage device 180. The user credentials may be used to obtain the device encryption key as described above with reference to FIG. 2. In action 5.12, the device encryption key 184 is provided to encryption engine 150. As described above, the device encryption key may be written to a keyslot register of encryption engine 150 and used by encryption engine 150 to decrypt blocks of the hot-plugged device SATA storage device 180. If the hot-plugged SATA storage device 180 is also protected by an ATA password, the steps described above with reference to actions 5.7 through 5.10 to unlock SATA storage device 180 are used to unlock the device before the device encryption key stored on the device can be accessed.

In action 5.13, Kerberos client 539A notifies hot plug virtualization firmware 545 that access to SATA storage device 180 has been approved. As described with reference to actions 5.7 through 5.10, if SATA storage device 180 was locked with an ATA password, the device has been unlocked. As described with reference to actions 5.11 and 5.12, if the device was encrypted by encryption engine 150, decryption has been enabled. In action 5.14, hot plug virtualization firmware 545 delivers a hot plug event to host operating system 115. Host operating system 115 then has access to the unlocked and decrypted data from SATA storage device 180. In response to receiving the host plug event, host operating system 115 may invoke a file system to mount SATA storage device 180 and/or incorporate SATA storage device 180 into a RAID array.

In the systems described above with reference to FIGS. 1 through 5B, encryption of storage devices is performed within chipset/secure partition 120 by encryption engine 150. Furthermore, the systems described with reference to FIGS. 1 through 5B above provide encryption and protected device management functionality within a secure partition of the system that is isolated from the host operating system. For example, encryption engine 150 resides within chipset/secure partition 120, protected device manager 235 of FIG. 2 resides in manageability engine (ME) 130 within chipset/secure partition 120, and SATA virtualization firmware 543 and hot plug virtualization firmware 545 of FIG. 5B reside within I/O command decode module 140 of chipset/secure partition 120.

Typically, auditable events are captured in auditing software running under control of a host operating system and/or BIOS. Because the management and encryption functionality described herein is isolated from the host operating system and BIOS, events performed within the secure partition are not captured by typical auditing software. However, it is desirable to capture and audit events that affect the management of protected devices and encryption of stored data. It is also desirable to perform audit operations in an environment that is protected from potential corruption of the host operating system and/or BIOS. It is also preferable to capture audit information at the time and within the secure environment in which an auditable event occurs.

Figure 6:
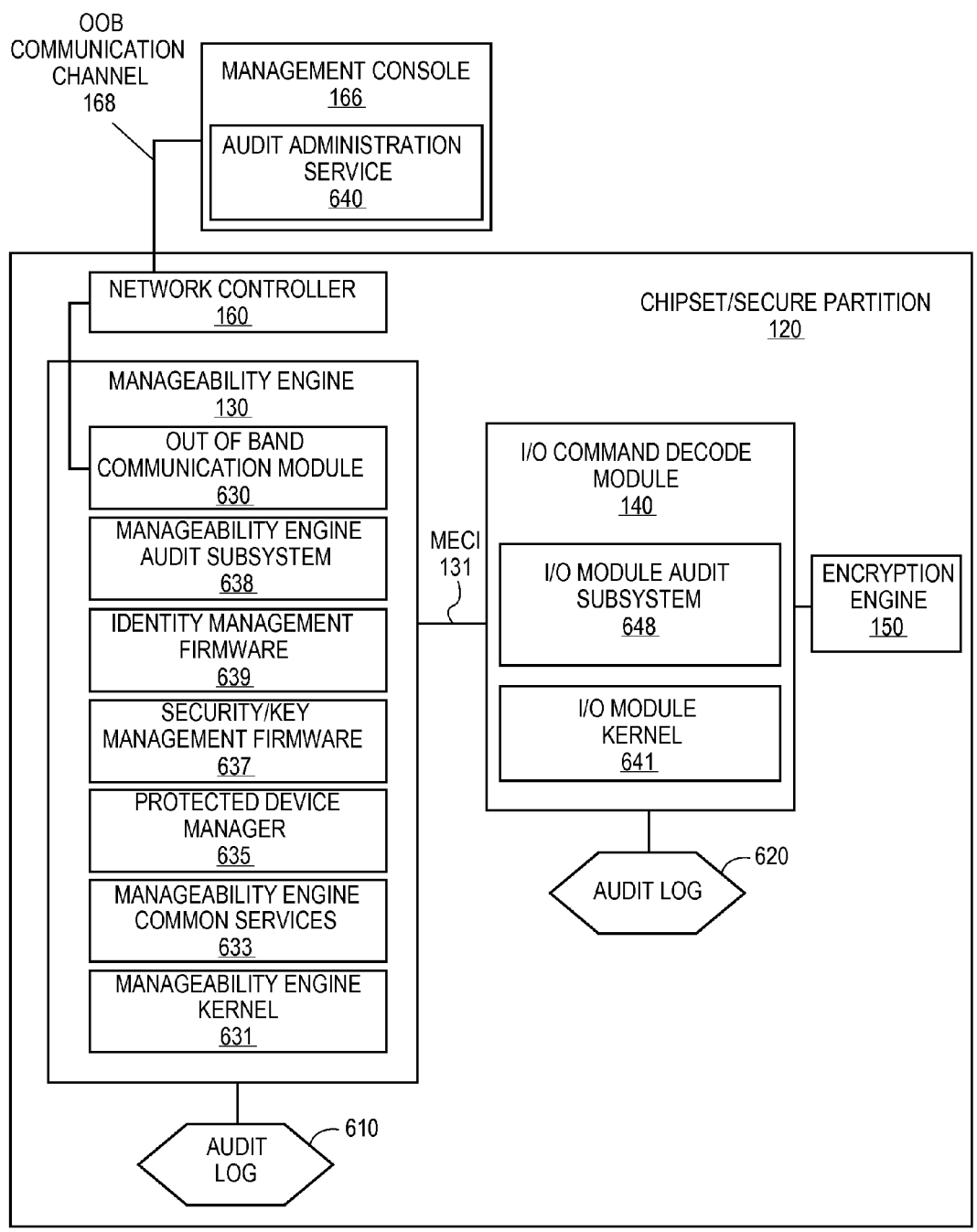
FIG. 6 shows further details of the system of FIG. 1 in managing protected devices in accordance with one embodiment of the invention.

FIG. 6 shows further details of the system of FIG. 1 in managing protected devices in accordance with one embodiment of the invention. Manageability engine kernel 631, manageability engine common services 633, protected device manager 635, security/key management firmware 637, and identity management firmware 639 operate as described with respect to counterpart components of FIGS. 2 and 5A.

In the embodiment shown in FIG. 6, manageability engine (ME) 130 includes a manageability engine audit subsystem 638 and I/O command decode module 140 includes an I/O module audit subsystem 648. Manageability engine audit subsystem 638 and I/O module audit subsystem 648 identify and process auditable actions that occur within their respective components of chipset/secure partition 120. Because I/O command decode module 140 prepares data for I/O to storage devices and works directly with encryption engine 150 to encrypt data as the data are written to storage devices, I/O module audit subsystem 648 captures auditable events that occur during I/O. In contrast, manageability engine (ME) 130 is not directly involved with I/O to storage devices, and thus manageability engine audit subsystem 638 captures auditable events related to management of protected devices. For example, manageability engine audit subsystem 638 captures events involving configuration and setup of systems to manage encryption, user authentication, device initialization and failure, encryption keys, theft detection, and other enterprise platform management policies.

Manageability engine audit subsystem 638 and I/O module audit subsystem 648 communicate via manageability engine controller interface (ME) 131. Manageability engine audit subsystem 638 may also communicate with a remote audit administration service 640 within management console 166 via OOB communication channel 168, network controller 160, and out-of-band communication module 630.

In one embodiment, auditable events are defined in an audit policy. The audit policy may define auditable events for which audit event records are to be generated as well as other non-auditable events that may be ignored. Because auditing every event that occurs within a system could greatly degrade performance of the system, the audit policy is used to selectively capture events of specific interest in accordance with organizational priorities and policies. In one embodiment, an audit bit mask is used as a selector to activate and deactivate different hardware and/or firmware components that are capable of detecting auditable events.

Types of events in an audit policy may include encryption system provisioning/deprovisioning events; user management events; device management events; key management events; device initialization events; theft detection events;

and device failure events. Specific auditable events may include events triggered by actions external to the secure partition of the system, such as events triggered by a host operating system that cause activity within the secure partition, and/or actions occurring internally within the secure partition, such as interrupts.

Externally-triggered events may include enabling or disabling theft protection services; creating, deleting, or modifying a user account; user logon/logoff success or failure; encryption key generated or deleted, for various types of encryption keys such as device encryption keys, device wrap keys, and recovery keys; device configured for encryption or decryption; device conversion or de-conversion as a security-managed device; device configuration for PASS_THROUGH; device migration or preparation for device migration; device encryption key (DEK) insertion or removal from encryption engine registers; audit event policy registration or deregistration; recovery of platform or device metadata; user of local platform token; changes in encryption policy, such as changes to key strength, key refresh, or remote configuration of encryption policy; transitions between authenticated and unauthenticated encryption; device unlock operations; device failure. Internally-triggered auditable events may include self-test failure of the manageability engine, I/O command decode module, encryption engine, and/or interfaces to the secure partition; Federal Information Processing Standard self-test success or failure; audit initialization failure; and/or memory failure.

When an event is detected by manageability engine audit subsystem 638 or I/O module audit subsystem 648, a determination may be made whether the detected event is one of the auditable events defined in the audit policy. If the detected event is one of the auditable events in the audit policy, the event is identified as an auditable event.

The audit policy may include instructions for servicing audit event records for each auditable event. The audit policy may further specify actions to be taken if an auditable event cannot be logged. For example, manageability engine audit subsystem 638 or I/O module audit subsystem 648 may be configured to halt or undo (reverse the effects of) an operation for which an audit event record cannot be written to an audit log. Furthermore, the audit policy may specify handling of exhausted audit storage log resources, so that manageability engine audit subsystem 638 or I/O module audit subsystem 648 can be configured to overwrite the audit log or to cease writing audit event records to the audit log.

In one embodiment, each of manageability engine audit subsystem 638 and I/O module audit subsystem 648 generates an audit event record for an identified auditable event. The audit event record is written to an audit log that is isolated from the host operating system. In the embodiment shown in FIG. 6, manageability engine audit subsystem 638 writes auditable events to audit log 610, and I/O module audit subsystem writes auditable events to audit log 620. In one embodiment, audit log 610 is stored in an isolated area of a flash memory such as an isolated area of data region 198 of flash memory 190 of FIG. 1, and audit log 620 is stored in an isolated area of non-volatile memory such as an isolated area of non-volatile memory storage device 172 of FIG. 1. Because non-volatile memory is faster than flash memory, in one embodiment, audit event records are written first to the audit log stored in non-volatile memory (audit log 620 in this example) if non-volatile memory is available. Because I/O command decode module 140 prepares data for I/O to storage devices and works directly with encryption engine 150 to encrypt data as the data are written to storage devices, I/O module audit subsystem 648 is coupled to the faster audit log 620 stored in non-volatile memory to reduce latency in processing I/O events. Because manageability engine audit subsystem 638 is not directly involved in I/O, manageability engine audit subsystem 638 writes audit event records to the slower audit log 610 stored in flash memory such as flash memory 190.

When audit log 610 and/or audit log 620 reaches a threshold, manageability engine audit subsystem 638 may notify remote audit administration service 640 to service the audit logs. In one embodiment, audit administration service 640 copies contents of audit logs 610 and 620 to remote storage and resets the threshold value. Audit administration service 640 does not interrupt operation of manageability engine audit subsystem 638 or I/O module audit subsystem 648, which continue to write audit event records to their respective audit logs 610 and 620 concurrently as auditable events are identified. When audit log 620 approaches a threshold value, I/O module audit subsystem 648 notifies manageability engine audit subsystem 638 via MECI 131 so that manageability engine audit subsystem 638 can send a request for service to audit administration service 640.

In one embodiment, manageability engine audit subsystem 638 works in conjunction with audit administration service 640 to manage all audit subsystems active within the secure partition. Manageability engine audit subsystem 638 may perform the functions of other audit subsystems, such as I/O module audit subsystem 648, when the other audit subsystem is overloaded and cannot process auditable events. Manageability engine audit subsystem 638 may also service audit logs for other audit subsystems. In one embodiment, manageability engine audit subsystem 638 requires other audit subsystems to register. Registration is used to notify manageability engine audit subsystem 638 that there is a local audit log, such as audit log 620, being maintained by the other audit subsystem. Registration may also be used to notify manageability audit subsystem 638 whether discrete auditable events may be re-routed for processing, and/or whether servicing of audit logs is requested.

In one embodiment, the operation of manageability engine audit subsystem 638 and I/O module audit subsystem 648 is controlled by enterprise domain privileges using Kerberos tickets. In one embodiment, an auditable event being performed in a secure partition of a system is identified, wherein the secure partition is isolated from a host operating system of the system. An audit event record is generated for the auditable event and the audit event record is written to an audit log that is isolated from the host operating system. In one embodiment, a plurality of auditable events is defined in an audit policy, the audit policy comprises instructions for servicing each auditable event of the plurality of auditable events, and identifying the auditable event comprises determining whether a detected event is one of the plurality of auditable events defined in the audit policy.

The audit log may be a first audit log of a plurality of audit logs that are accessible only from within the secure partition. Each audit log of the plurality of audit logs is isolated from the host operating system. In one embodiment, a determination is made whether the first audit log is available. The audit event record is sent to a first audit subsystem associated with the first audit log if the first audit log is available, and the first audit subsystem performs writing the audit event record to the first audit log. If the first audit log is not available, the audit event record is sent to a second audit subsystem associated with a second audit log of the plurality of audit logs, and the second audit subsystem performs writing the audit event record to the second audit log.

In one embodiment, the latency of write operations to the first audit log is monitored. If the latency reaches a predetermined threshold, subsequent write operations are transferred to the second audit subsystem so that subsequent audit event records for the subsequent write operations can be written to the second audit log. In another embodiment, if the latency reaches a predetermined threshold, a request to service the first audit log is sent to the second audit subsystem. The second audit subsystem services the first audit log by moving audit event records from the first audit log to another location, such as to a third audit log. In one embodiment, the second audit subsystem schedules a remote management application to service the third audit log, the remote management application establishes a secure communication channel with the secure partition, and the remote management application services the third audit log via the secure communication channel.

In one embodiment, a request to service an audit log is received from a secure partition of a requesting system, wherein the secure partition is isolated from a host operating system of the requesting system, the audit log contains an audit event record of an auditable event performed in the secure partition, and the audit log is isolated from the host operating system of the requesting system. A secure communication channel is established with the secure partition; and the audit log is serviced via the secure communication channel. Servicing the audit log may include processing the auditable event in accordance with an audit policy.

Figure 7:
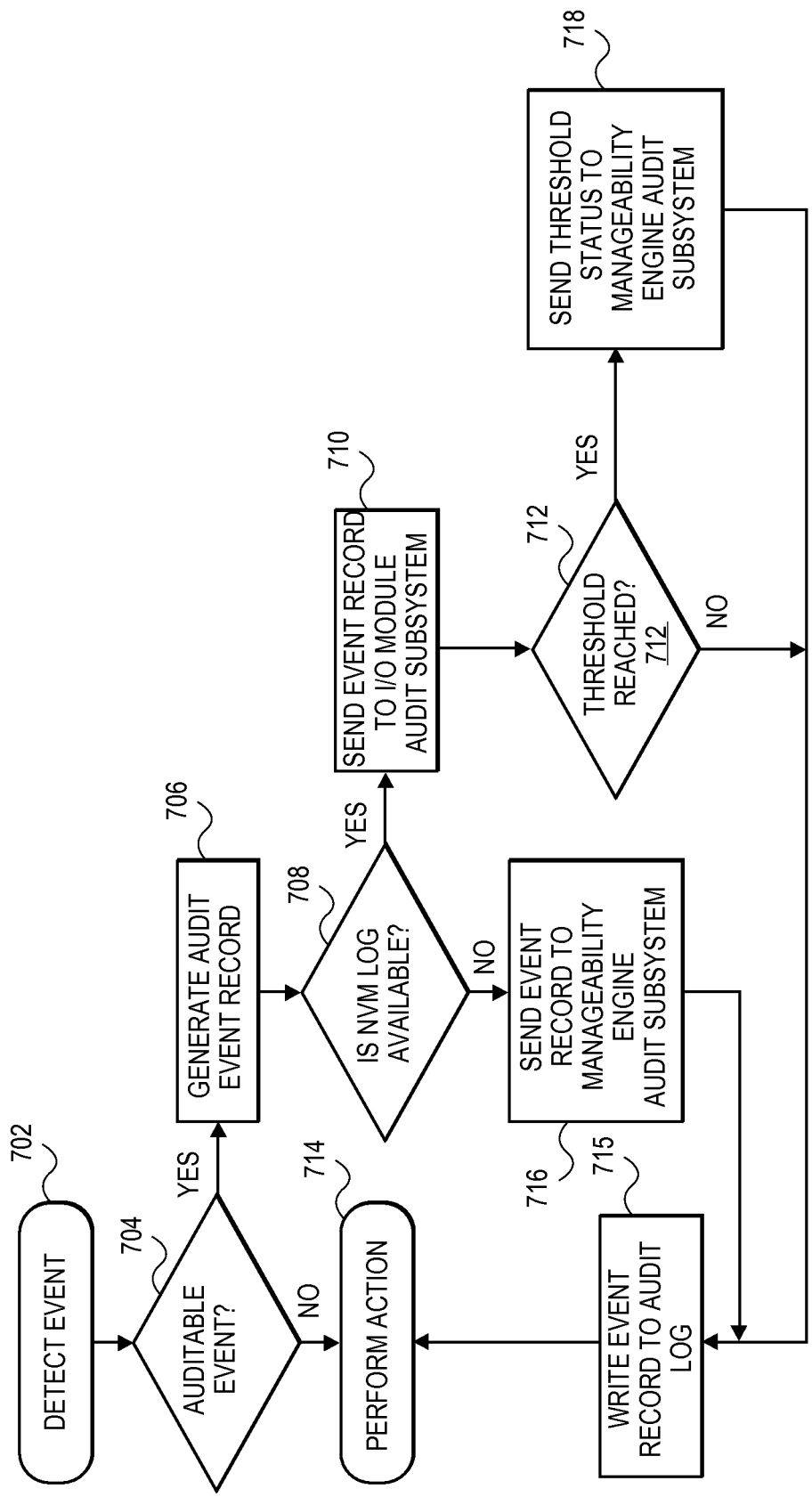
FIG. 7 is a flowchart of a method to be performed upon detecting a potentially-auditable event occurring within a secure partition of a system in accordance with one embodiment of the invention.

FIG. 7 is a flowchart of a method to be performed upon detecting a potentially-auditable event occurring within a secure partition of a system in accordance with one embodiment of the invention. Upon the detection of an event occurring within a secure partition such as chipset/secure partition 120 at "Detect Event" step 702, control proceeds to "Auditable Event?" decision point 704. At "Auditable Event?" decision point 704, either logic encoded in hardware and/or the respective audit subsystem (either manageability engine audit subsystem 638 or I/O module audit subsystem 648) may check an audit policy to determine whether the event is auditable. In one embodiment, an audit bit mask is used to activate different hardware and/or firmware components that are capable of detecting auditable events. Evaluation of the audit bit mask at "Auditable Event?" decision point 704 determines whether the event is auditable.

At "Auditable Event?" decision point 704, if the event is auditable, control proceeds to "Generate Audit Event Record" step 706. An audit event record is generated by either logic encoded in hardware and/or the respective audit subsystem (either manageability engine audit subsystem 638 or I/O module audit subsystem 648). After generation of the audit event record, control proceeds to "Is NVM Log Available?" decision point 708. As discussed previously, if a non-volatile memory log is available, it is preferable to write the audit event record to non-volatile memory to reduce latency associated with processing the event. At "Is NVM Log Available?" decision point 708, if an NVM log is available, control proceeds to "Send Event Record to I/O Module Audit Subsystem" step 710. At "Send Event Record to I/O Module Audit Subsystem" step 710, the event record is sent to I/O module audit subsystem 648.

From "Send Event Record to I/O Module Audit Subsystem" step 710, control proceeds to "Threshold Reached?" decision point 712. Examples of a threshold being reached are when I/O Module utilization falls below normal levels and/or the audit log becomes full. When a threshold is reached, control proceeds to "Send Threshold Status to Manageability Engine Audit Subsystem" step 718. For example, when I/O module utilization falls below the threshold level, audit activity may need to be offloaded to manageability engine audit subsystem 638 and/or audit log 620 may need to be serviced. When "Send Threshold Status to Manageability Engine Audit Subsystem" step 718 is executed, manageability engine audit subsystem 638 takes the appropriate action to manage reaching the threshold in accordance with the audit policy. For example, manageability engine audit subsystem 638 may schedule audit administration service 640 to service the log and/or copy the log that has reached a threshold to other archive storage. From "Send Threshold Status to Manageability Engine Audit Subsystem" step 718, control proceeds to "Write Event Record to Audit Log" step 715, where the audit event record that caused the threshold to be reached is written to a log by manageability engine audit subsystem 638.

From "Threshold Reached?" decision point 712, if no threshold has been reached, control proceeds to "Write Event Record to Audit Log" step 715, where the respective audit subsystem writes the audit event record to its respective log. Control then proceeds to "Perform Event" step 714, where the event is performed and processing the auditable event is complete.

At "Is NVM Log Available?" decision point 708, if an NVM log is not available, control proceeds to "Sent Event Record to Manageability Engine Audit Subsystem" step 716. The audit event record is sent to manageability engine audit subsystem 638. Manageability engine audit subsystem 638 then writes the event record to audit log 610 in "Write Event Record to Audit Log" step 715. Control proceeds to "Perform Event" step 714, where the event is performed and processing the auditable event is complete.

At "Auditable Event?" decision point 704, if the event is not auditable, control proceeds to "Perform Event" step 714. The event is performed and processing of the event is complete.

Processing of auditable events can be performed by logic encoded in hardware and/or by firmware. Initialization of chipset/secure partition 120 components, such as manageability engine (ME) 130, I/O command decode module 140, and encryption engine 150 are auditable events that may be encoded into the hardware for those respective components and/or included in firmware for those respective components. Similarly, hardware and/or firmware for controllers and interfaces, such as HECI 111b, VECI 111c, network controller 160, USB controller 175, I/O controller 170 may include logic to process auditable events.

Audit event processing can be performed within manageability engine (ME) 130 upon initial configuration as well as during operation of components of manageability engine (ME) 130, such as during operation of security/key management firmware 237 of FIG. 2. For example, audit events may be triggered when security/key management firmware 237 writes a device encryption key (DEK) into a corresponding register of encryption engine 150 when a storage device is to be encrypted or removes the DEK from the corresponding register of encryption engine 150 when encryption is disabled.

Audit event processing may also be performed when data are transferred in cleartext form from I/O controller 170 to encryption engine 150 (for a write operation) and when data are returned by encryption engine 150 in cipher-text form. Auditing events occurring via the channel between I/O controller 170 and encryption engine 150 provides proof that data are being encrypted, although the audit policy may limit auditing these events to periodic compliance testing.

Audit event processing may be performed at manageability engine controller interface (MECI) 131 because coordination between audit subsystems may be communicated via MECI 131. Initial configuration of I/O command decode module 140 is also performed via MECI 131 and will generate auditable events.

Audit event processing may be generated by communication from processor 110 via interfaces HECI 111*b* and VECI 111*c*. For example, ATA security commands that pertain to the locking state of a device produce auditable events, as well as commands that propagate via these interfaces to I/O controller 170 or USB controller 175. Furthermore, HECI commands pertaining to user authentication, encryption, security, key management, and status are auditable events. Commands used to initialize controllers such as I/O controller 170, USB controller 175, and network controller 160 are also auditable events. Audit log storage and configuration commands are also auditable, as are audit subsystem communication with remote audit administration service 640 of FIG. 6. Attachment of a device to platform 100 via USB controller 175 and/or I/O controller 170 is an auditable event.

By configuring particular events to be auditable or not in an audit policy, the audit system can be fine-tuned to balance performance, storage capacity, and security. By managing audit subsystems via a remote management console and audit administration service via a secure communication channel, integrity of audit information can be protected.

Figure 8:
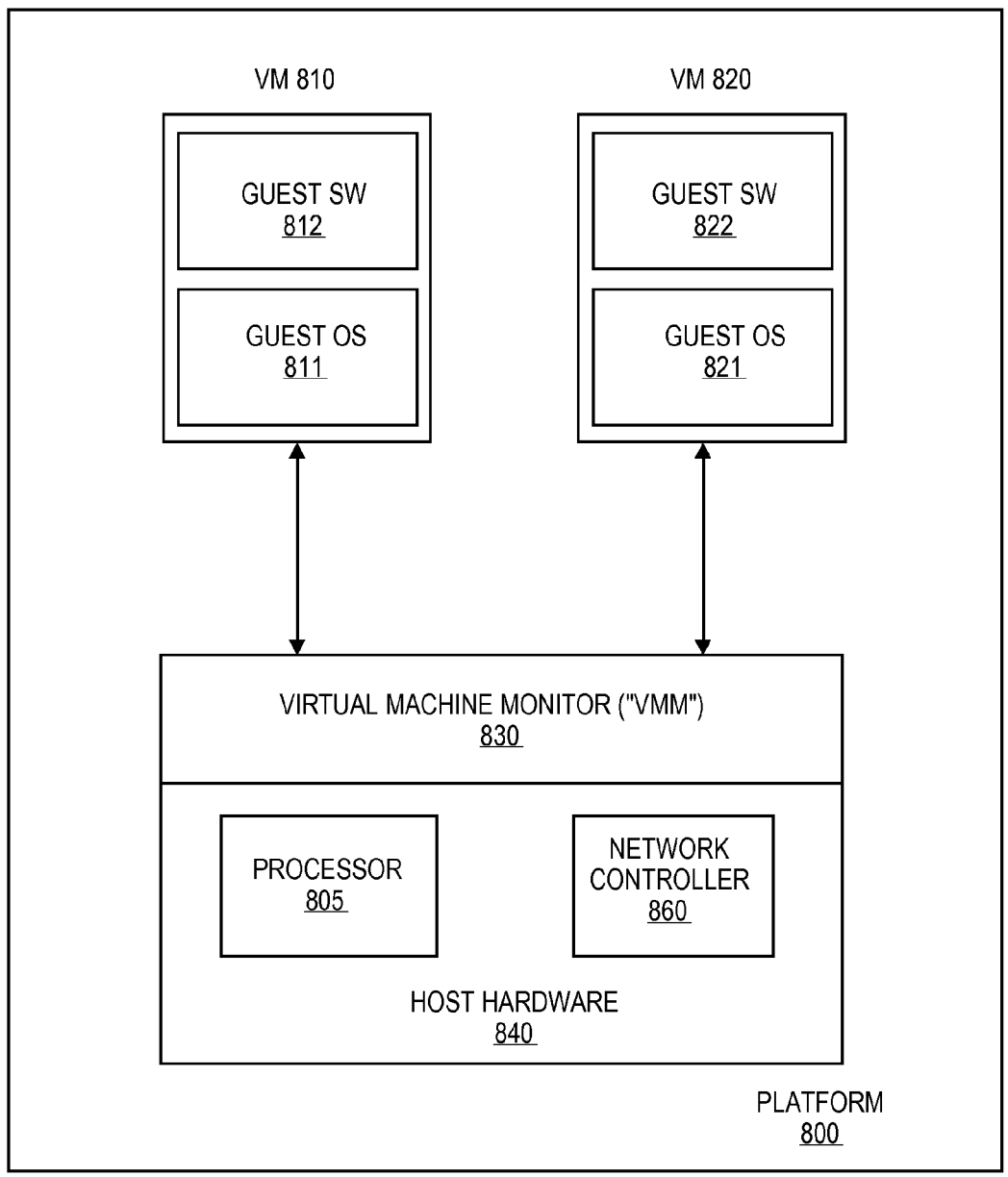
FIG. 8 shows a virtual machine environment for implementing a secure partition for managing actions such as protecting devices using encryption, user identity authentication, and password protection schemes in accordance with one embodiment of the invention.

FIG. 8 shows a virtual machine environment for implementing a secure partition for managing actions such as protecting devices using encryption, user identity authentication, and password protection schemes in accordance with one embodiment of the invention. If platform 800 is virtualized, it may include only a single processor but a virtual machine monitor ("VMM 830") on the host may present multiple abstractions and/or views of the host, such that the underlying hardware of the host appears as one or more independently operating virtual machines ("VMs"). VMM 830 may be implemented in software (e.g., as a standalone program and/or a component of a host operating system), hardware, firmware and/or any combination thereof. VMM 830 manages allocation of resources on the host and performs context switching as necessary to cycle between various VMs according to a round-robin or other predetermined scheme. It will be readily apparent to those of ordinary skill in the art that although only one processor is illustrated ("Processor 805"), embodiments of the present invention are not so limited and multiple processors may also be utilized within a virtualized environment.

Although only two VM partitions are illustrated ("VM 810" and "VM 820", hereafter referred to collectively as "VMs"), these VMs are merely illustrative and additional virtual machines may be added to the host. VM 810 and VM 820 may function as self-contained platforms respectively, running their own "guest operating systems" (i.e., operating systems hosted by VMM 830, illustrated as "Guest OS 811" and "Guest OS 821" and hereafter referred to collectively as "Guest OS") and other software (illustrated as "Guest Software 812" and "Guest Software 822" and hereafter referred to collectively as "Guest Software").

Each Guest OS and/or Guest Software operates as if it were running on a dedicated computer rather than a virtual machine. That is, each Guest OS and/or Guest Software may expect to control various events and have access to hardware resources on platform 800. Within each VM, the Guest OS and/or Guest Software may behave as if they were, in effect, running on platform 800's physical hardware ("Host Hardware 840", which may include a network controller 860).

It will be readily apparent to those of ordinary skill in the art that a physical hardware partition with a dedicated processor such as manageability engine (ME) 130 of FIG. 1 may provide a higher level of security than a virtualized partition (as illustrated in FIG. 8), but embodiments of the invention may be practiced in either environment and/or a combination of these environments to provide varying levels of security. It will also be readily apparent to those of ordinary skill in the art that an ME, AMT or PRL platform may be implemented within a virtualized environment. For example, VM 820 may be dedicated as an ME partition on a host while VM 810 runs typical applications on the host. In this scenario, the host may or may not include multiple processors. If the host does include two processors, for example, VM 820 may be assigned the other processor while VM 810 (and other VMs on the host) may share the resources of processor 805. On the other hand, if the host includes only a single processor, the processor may serve both the VMs, but VM 820 may still be isolated from the other VMs on the host with the cooperation of VMM 830. For the purposes of simplicity, embodiments of the invention are described in a manageability engine (ME) environment, but embodiments of the invention are not so limited. Instead, any reference to manageability engine, ME, a "partition", "a secure partition", a "security partition" and/or a "management partition" shall include any physical and/or virtual partition (as described above).

Upon start-up or when a new device is hot-plugged into the platform, VMM 830 assigns the device to a VM 810 or 820. To perform auditing within chipset/secure partition 120 in a virtualized environment such as that described in FIG. 8, VMM 830 manages an audit mask profile for each of VMs 810 and 820. When a device is assigned to either VM 810 or 820, the respective audit mask profile for the VM is associated with the chipset/secure partition 120. Each time the VM audit mask profile associated with chipset/secure partition 120 changes, VMM 830 generates an audit event record. In this way, the VM 810 or 820 that initiates an auditable event is represented in the audit event records. For example, the VM 810 or 820 that issues storage I/O commands to the device is identified in the audit event records.

If a device is hot-plugged into the platform, the VM 810 or 820 that received the device assignment is identified in the audit event record. When a hot-plug event is detected, I/O command decode module 140 may need to determine whether the VM 810 or 820 currently associated with chipset/secure partition 120 is authorized to receive the device assignment. Until the device is assigned and the correct audit mask profile to be assigned to chipset/secure partition 120 can be determined, an internal audit mask profile may be used to audit events after the hot-plug event until device assignment occurs.

VMM 830 may identify the currently active VM audit mask profile to chipset/secure partition by writing the currently active audit mask profile to flash memory 190. Flash memory 190 is also used to maintain user account metadata associated with each VM. When a storage device is to be unlocked using either a device password or a device encryption key, an additional check can be performed to ensure that the user account metadata in flash memory 190 corresponds to the VM to which the device was assigned.

VMM 830 ensures that transient VM environments do not result in unauthorized assignment of drives. In one embodiment, VMM 830 generates a GUID (globally unique ID) for each VM 810 and 820. The GUID is used to partition metadata in flash memory 190.

Embodiments of the mechanisms disclosed herein may be implemented in hardware, software, firmware, or a combination of such implementation approaches. Embodiments of the invention may be implemented as computer programs executing on programmable systems comprising at least one processor, a data storage system (including volatile and non-volatile memory and/or storage elements), at least one input device, and at least one output device.

Program code may be applied to input data to perform the functions described herein and generate output information. Embodiments of the invention also include machine-accessible media containing instructions for performing the operations of the invention or containing design data, such as HDL, which defines structures, circuits, apparatuses, processors and/or system features described herein. Such embodiments may also be referred to as program products.

Such machine-accessible storage media may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), magneto-optical disks, semiconductor devices such as read-only memories (ROMs), random access memories (RAMs) such as dynamic random access memories (DRAMs), static random access memories (SRAMs), erasable programmable read-only memories (EPROMs), flash programmable memories (FLASH), electrically erasable programmable read-only memories (EEPROMs), magnetic or optical cards, or any other type of media suitable for storing electronic instructions.

The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language.

Presented herein are embodiments of methods and systems for management of devices protected by encryption, user authentication, and password protection schemes. While particular embodiments of the present invention have been shown and described, it will be obvious to those skilled in the art that numerous changes, variations and modifications can be made without departing from the scope of the appended claims. Accordingly, one of skill in the art will recognize that changes and modifications can be made without departing from the present invention in its broader aspects. The appended claims are to encompass within their scope all such changes, variations, and modifications that fall within the true scope and spirit of the present invention.

What is claimed is:

1. A computer-implemented method comprising:
   authenticating first credentials of a user of a system before access is allowed to any device of a plurality of devices attached to the system;
   intercepting an event indicating a hot-plug attachment of a new device to the system, wherein the intercepting is performed by firmware in a secure partition of the system, and the secure partition is isolated from a host operating system of the system;
   requesting second credentials to access the new device using the firmware to establish trusted path connections to a display device to display a request for the second credentials and a user input device to receive the second credentials, wherein the second credentials are requested by the firmware without rebooting the system;
   authenticating the second credentials;
   enabling access to the new device after authenticating the second credentials; and
   delivering a hot plug event for the new device from the secure partition to the host operating system.

2. The method of claim 1, wherein enabling access to the new device comprises using a native command for the device to enable decryption of the new device.

3. The method of claim 1, wherein the second credentials comprise a password for the new device; and
   enabling access to the new device comprises using the password to unlock the new device.

4. The method of claim 1, wherein the second credentials comprise a user identifier; and
   enabling access to the new device comprises providing the user identifier to a trusted third party and enabling access to the new device if the trusted third party authenticates the user identifier.

5. An apparatus comprising: at least one processor;
   a secure partition isolated from a host operating system executing on the processor; and
   a memory comprising instructions for firmware executing in the secure partition to perform the following:
   authenticating first credentials of a user of a system before access is allowed to any device of a plurality of devices attached to the system;
   intercepting an event indicating a hot-plug attachment of a new device to the system, wherein the intercepting is performed by the secure partition;
   requesting second credentials to access the new device using the firmware to establish trusted path connections to a display device to display a request for the second credentials and a user input device to receive the second credentials, wherein the second credentials are requested by the firmware without rebooting the system;
   authenticating the second credentials;
   enabling access to the new device after authenticating the second credentials; and
   delivering a hot plug event for the new device from the secure partition to the host operating system.

6. A computer program product comprising: a non-transitory computer-readable storage medium; and
   instructions in the computer-readable storage medium, wherein the instructions, when executed in a secure partition of a processing system, cause firmware executing in the secure partition to perform operations comprising:
   authenticating first credentials of a user of a system before access is allowed to any device of a plurality of devices attached to the system;
   intercepting an event indicating a hot-plug attachment of a new device to the system, wherein the intercepting is performed by the secure partition, and the secure partition is isolated from a host operating system of the system;

requesting second credentials to access the new device using the firmware to establish trusted path connections to a display device to display a request for the second credentials and a user input device to receive the second credentials, wherein the second credentials are requested by the firmware without rebooting the system;

authenticating the second credentials;

enabling access to the new device after authenticating the second credentials; and delivering a hot plug event for the new device from the secure partition to the host operating system.

* * * * *